(12) United States Patent
Inoue

(10) Patent No.: US 10,000,254 B2
(45) Date of Patent: Jun. 19, 2018

(54) BICYCLE PEDAL

(71) Applicant: SHIMANO INC., Sakai (JP)

(72) Inventor: Akira Inoue, Sakai (JP)

(73) Assignee: SHIMANO INC., Sakai (JP)

( * ) Notice: Subject to any disclaimer, the term of this patent is extended or adjusted under 35 U.S.C. 154(b) by 143 days.

(21) Appl. No.: 14/848,223

(22) Filed: Sep. 8, 2015

(65) Prior Publication Data

US 2017/0066498 A1 Mar. 9, 2017

(51) Int. Cl.
*B62M 3/08* (2006.01)

(52) U.S. Cl.
CPC .................. *B62M 3/086* (2013.01)

(58) Field of Classification Search
CPC ............... Y10T 74/217; Y10T 74/2172; Y10T 74/2168; Y10T 74/2164; B62M 3/086; B62M 3/083; B62M 3/08; A43B 5/14
See application file for complete search history.

(56) References Cited

U.S. PATENT DOCUMENTS

| 5,115,692 | A | * | 5/1992 | Nagano | B62M 3/086 280/11.31 |
| 5,784,931 | A |   | 7/1998 | Ueda | |
| 5,852,956 | A | * | 12/1998 | Chen | B62M 3/086 74/594.4 |
| 6,112,620 | A | * | 9/2000 | Chen | B62M 3/086 74/594.4 |

* cited by examiner

*Primary Examiner* — Daniel D Yabut
(74) *Attorney, Agent, or Firm* — Mori & Ward, LLP

(57) ABSTRACT

A bicycle pedal comprises a pedal axle, a first pedal body, a second pedal body, a first cleat engagement member, a second cleat engagement member, a gripping member, and a biasing member. The gripping member is configured to be movably coupled to the first pedal body. The gripping member includes a first gripping portion configured to protrude from a first surface when viewed from an axial direction parallel to a rotational axis in a first state where the second pedal body is positioned at a first position relative to the first pedal body. The biasing member is configured to bias the gripping member such that, in response to a pivotal movement of the second pedal body from the first position to a second position, a tip end of the first gripping portion is moved toward the first surface when viewed from the axial direction.

30 Claims, 20 Drawing Sheets

BICYCLE PEDAL

BACKGROUND OF THE INVENTION

Field of the Invention

The present invention relates to a bicycle pedal.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle pedal such as a clipless pedal.

SUMMARY OF THE INVENTION

In accordance with a first aspect of the present invention, a bicycle pedal comprises a pedal axle, a first pedal body, a second pedal body, a first cleat engagement member, a second cleat engagement member, a gripping member, and a biasing member. The pedal axle has a rotational axis. The first pedal body is configured to be rotatably coupled to the pedal axle about the rotational axis. The first pedal body includes a first surface. The second pedal body is configured to be rotatably coupled to the pedal axle about the rotational axis. The second pedal body is pivotable relative to the first pedal body about the rotational axis between a first position and a second position. The first cleat engagement member is configured to be coupled to the second pedal body. The second cleat engagement member is configured to be coupled to the second pedal body. The first cleat engagement member and the second cleat engagement member are configured to be engaged with a cleat attached to a shoe to couple the cleat to the second pedal body. The gripping member is configured to be movably coupled to the first pedal body. The gripping member includes a first gripping portion configured to protrude from the first surface when viewed from an axial direction parallel to the rotational axis in a first state where the second pedal body is positioned at the first position relative to the first pedal body. The biasing member is configured to bias the gripping member such that, in response to a pivotal movement of the second pedal body from the first position to the second position, a tip end of the first gripping portion is moved toward the first surface when viewed from the axial direction.

With the bicycle pedal according to the first aspect, it is possible to move the first gripping portion toward the first surface in response to the pivotal movement of the second pedal body from the first position to the second position. This can reduce interference between the first gripping portion and a sole of a shoe when the cleat is secured to the first cleat engagement member and the second cleat engagement member (in a step-in operation), making the step-in operation of the bicycle pedal smoother.

In accordance with a second aspect of the present invention, the bicycle pedal according to the first aspect further comprises a pivot shaft configured to pivotally couple the gripping member to the first pedal body about a pivot axis substantially parallel to the rotational axis.

With the bicycle pedal according to the second aspect, it is possible to support the griping member with a simple structure.

In accordance with a third aspect of the present invention, the bicycle pedal according to the second aspect is configured so that the pivot shaft is configured to be attached to the first pedal body.

With the bicycle pedal according to the third aspect, it is possible to support the gripping member relative to the first pedal body with a simple structure.

In accordance with a fourth aspect of the present invention, the bicycle pedal according to the second or third aspect is configured so that the pivot shaft is configured to guide the gripping member to move relative to the first pedal body in a guiding direction perpendicular to the pivot axis.

With the bicycle pedal according to the fourth aspect, it is possible to pivot and/or move the gripping member relative to the first pedal body when an external force is applied from the sole of the shoe to the gripping member. This can reduce the gripping member from inhibiting relative movement between the shoe and the first pedal body.

In accordance with a fifth aspect of the present invention, the bicycle pedal according to the fourth aspect is configured so that the gripping member includes a guide part slidable with the pivot shaft such that the first gripping portion is movable relative to the first pedal body in the guiding direction.

With the bicycle pedal according to the fifth aspect, it is possible to easily guide the gripping member in the guiding direction.

In accordance with a sixth aspect of the present invention, the bicycle pedal according to the fifth aspect is configured so that the gripping member is positioned at a first grip position relative to the first pedal body in the first state where the second pedal body is positioned at the first position relative to the first pedal body. The guide part extends in the guiding direction when viewed from the axial direction in a first grip state where the gripping member is positioned at the first grip position relative to the first pedal body.

In accordance with a seventh aspect of the present invention, the bicycle pedal according to the sixth aspect is configured so that the guide part includes an elongated hole extending in the guiding direction when viewed from the axial direction in the first grip state of the gripping member. The pivot shaft extends through the elongated hole.

With the bicycle pedal according to the seventh aspect, it is possible to guide the gripping member in the guiding direction with a simple structure.

In accordance with an eighth aspect of the present invention, the bicycle pedal according to any one of the first to seventh aspects is configured so that the gripping member includes a transmitting portion configured to transmit a rotational force applied to the second pedal body to the gripping member.

With the bicycle pedal according to the eighth aspect, it is possible to move the gripping member in response to the movement of the second pedal body.

In accordance with a ninth aspect of the present invention, the bicycle pedal according to the eighth aspect is configured so that the biasing member is configured to bias the second pedal body toward the first position via the transmitting portion.

With the bicycle pedal according to the ninth aspect, it is possible to utilize the biasing member to move the second pedal body toward the first position. This can eliminate another biasing member to move the second pedal body relative to the first pedal body toward the first position.

In accordance with a tenth aspect of the present invention, the bicycle pedal according to any one of the first to ninth aspect is configured so that the first pedal body includes a second surface opposite to the first surface. The gripping member includes a second gripping portion configured to protrude from the second surface when viewed from the axial direction in the first state of the second pedal body.

With the bicycle pedal according to the tenth aspect, it is possible to use the second gripping portion to grip the sole of the shoe when the second surface upwardly faces. This allows the gripping member to grip the sole of the shoe when each of the first surface and the second surface upwardly faces.

In accordance with an eleventh aspect of the present invention, the bicycle pedal according to the tenth aspect is configured so that the first pedal body includes a first part and a second part opposite to the first part relative to the rotational axis. The first gripping portion is closer to the second part than to the first part. The second gripping portion is closer to the second part than to the first part.

In accordance with a twelfth aspect of the present invention, the bicycle pedal according to the tenth or eleventh aspect is configured so that the gripping member is positioned at a first grip position relative to the first pedal body in the first state of the second pedal body. The first gripping portion protrudes from the first surface by a first amount of protrusion when viewed from the axial direction in a first grip state where the gripping member is positioned at the first grip position relative to the first pedal body. The second gripping portion protrudes from the second surface by a second amount of protrusion when viewed from the axial direction in the first grip state of the gripping member. The second amount of protrusion is substantially equal to the first amount of protrusion.

With the bicycle pedal according to the twelfth aspect, the first gripping portion and the second gripping portion can respectively grip the sole of the shoe when the first surface and the second surface upwardly face.

In accordance with a thirteenth aspect of the present invention, the bicycle pedal according to any one of the tenth to twelfth aspects is configured so that the gripping member includes a support portion pivotable relative to the first pedal body about a pivot axis substantially parallel to the rotational axis. The first gripping portion is pivotally coupled to the support portion about a first additional pivot axis different from the pivot axis.

In accordance with a fourteenth aspect of the present invention, the bicycle pedal according to the thirteenth aspect is configured so that the second gripping portion is pivotally coupled to the support portion about a second additional pivot axis different from the pivot axis and the first additional pivot axis. The pivot axis is provided between the first additional pivot axis and the second additional pivot axis when viewed from the axial direction.

With the bicycle pedal according to the fourteenth aspect, it is possible to move the first gripping portion and the second gripping portion relative to the first pedal body in response to movement of the support portion.

In accordance with a fifteenth aspect of the present invention, the bicycle pedal according to the thirteenth or fourteenth aspect is configured so that the biasing member includes a coiled body. The coiled body surrounds the first additional pivot axis when viewed from the axial direction.

With the bicycle pedal according to the fifteenth aspect, it is possible to apply a rotational force from the biasing member to the support member by using the biasing force of the biasing member.

In accordance with a sixteenth aspect of the present invention, the bicycle pedal according to the fifteenth aspect is configured so that the biasing member includes a first end and a second end. The first end extends from the coiled body and is engaged with the first gripping portion to transmit the biasing force to the first gripping portion. The second end extends from the coiled body and is engaged with the second gripping portion to transmit the biasing force to the second gripping portion.

With the bicycle pedal according to the sixteenth aspect, it is possible to bias the first gripping portion and the second gripping portion with the biasing member.

In accordance with a seventeenth aspect of the present invention, the bicycle pedal according to any one of the fourteenth to sixteenth aspects is configured so that the first pedal body includes a first guide portion and a second guide portion. The first guide portion is configured to guide the first gripping portion when the first gripping portion pivots relative to the support portion about the first additional pivot axis. The second guide portion is configured to guide the second gripping portion when the second gripping portion pivots relative to the support portion about the second additional pivot axis.

With the bicycle pedal according to the seventeenth aspect, it is possible to stabilize movement of the first gripping portion and the second gripping portion with the first guide portion and the second guide portion.

In accordance with an eighteenth aspect of the present invention, the bicycle pedal according to any one of the tenth to seventeenth aspects is configured so that the gripping member is positioned at a first grip position relative to the first pedal body in the first state of the second pedal body. The first gripping portion protrudes from the first surface by a first amount of protrusion when viewed from the axial direction in a first grip state where the gripping member is positioned at the first grip position relative to the first pedal body. The second gripping portion protrudes from the second surface by a second amount of protrusion when viewed from the axial direction in the first grip state of the gripping member. The second amount of protrusion is smaller than the first amount of protrusion.

In accordance with a nineteenth aspect of the present invention, the bicycle pedal according to any one of the tenth to eighteenth aspects is configured so that the first gripping portion and the second gripping portion are integrally pivotable relative to the first pedal body about a pivot axis substantially parallel to the rotational axis.

With the bicycle pedal according to the nineteenth aspect, it is possible to move the first gripping portion and the second gripping portion together with a simple structure.

In accordance with a twentieth aspect of the present invention, the bicycle pedal according to any one of the first to nineteenth aspect is configured so that the second cleat engagement member is closer to the first gripping portion than the first cleat engagement member. The tip end of the first gripping portion is provided above the second cleat engagement member when the first surface upwardly faces in the first state of the second pedal body.

With the bicycle pedal according to the twentieth aspect, it is possible to increase the gripping function of the first gripping portion in the first state of the second pedal body.

In accordance with a twenty-first aspect of the present invention, the bicycle pedal according to the twentieth aspect is configured so that an uppermost end of the second cleat engagement member is provided above the first gripping portion when the first surface upwardly faces in a second state where the second pedal body is positioned at the second position relative to the first pedal body.

With the bicycle pedal according to the twenty-first aspect, it is possible to restrict the first gripping portion from inhibiting relative movement between the shoe and the first pedal body in the second state of the second pedal body. This allows the cleat to be easily detached from the first cleat engagement member and the second cleat engagement member.

In accordance with a twenty-second aspect of the present invention, the bicycle pedal according to any one of the first to twenty-first aspects is configured so that an uppermost end of the first cleat engagement member is provided above an uppermost end of the second cleat engagement member when the first surface upwardly faces in the first state of the second pedal body.

With the bicycle pedal according to the twenty-second aspect, it is possible to easily bring the cleat into engagement with the first cleat engagement member.

In accordance with a twenty-third aspect of the present invention, a bicycle pedal comprises a pedal axle, a first pedal body, a second pedal body, a first cleat engagement member, a second cleat engagement member, a biasing member, and a pivot shaft. The pedal axle has a rotational axis. The first pedal body is configured to be rotatably coupled to the pedal axle about the rotational axis. The second pedal body is configured to be rotatably coupled to the pedal axle about the rotational axis. The second pedal body is pivotable relative to the first pedal body about the rotational axis between a first position and a second position. The first cleat engagement member is configured to be coupled to the second pedal body. The second cleat engagement member is configured to be coupled to the second pedal body. The first cleat engagement member and the second cleat engagement member are configured to be engaged with a cleat attached to a shoe to couple the cleat to the second pedal body. The biasing member is configured to bias the second pedal body toward the first position. The pivot shaft is configured to support the biasing member about a pivot axis substantially parallel to the rotational axis, the pivot axis being different from the rotational axis.

With the bicycle pedal according to the twenty-third aspect, it is possible to bias the second pedal body toward the first position with a simple structure. Thus, it is possible to omit another biasing member provided on the rotational axis to bias the second pedal body toward the first position.

In accordance with a twenty-fourth aspect of the present invention, the bicycle pedal according to the twenty-third aspect further comprises a biasing force transmitting member rotatably disposed about the pivot axis, the biasing force transmitting member being configured to contact the second pedal body to transmit the biasing force of the biasing member to the second pedal body.

With the bicycle pedal according to the twenty-fourth aspect, it is possible to effectively transmit the biasing force to the second pedal body via the biasing force transmitting member.

BRIEF DESCRIPTION OF THE DRAWINGS

A more complete appreciation of the invention and many of the attendant thereof will be readily obtained as the same becomes better understood by reference to the following detailed description when considered in connection with the accompanying drawings.

DESCRIPTION OF THE EMBODIMENTS

Figure 1:
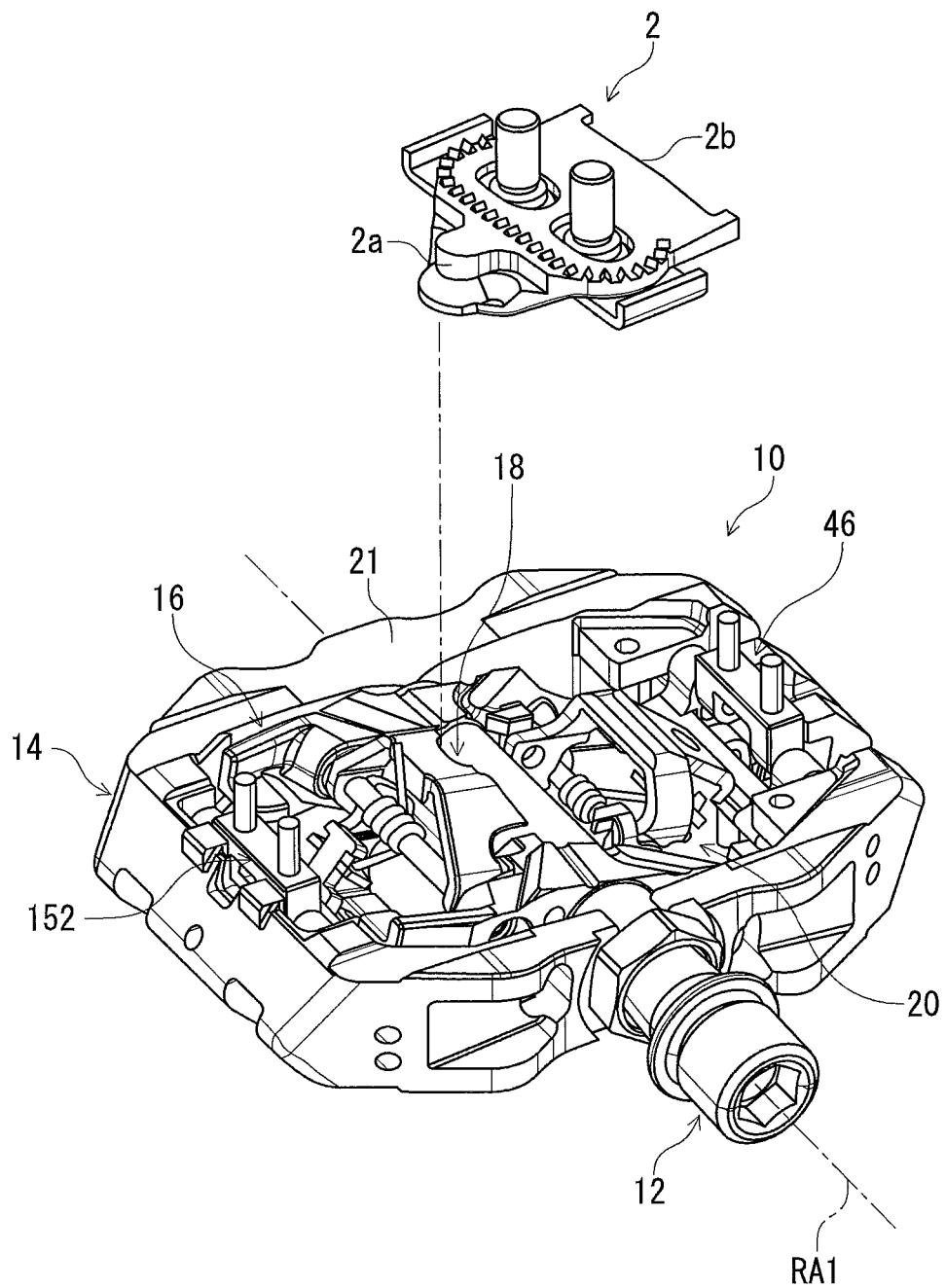
FIG. 1 is a perspective view of a bicycle pedal in accordance with a first embodiment, with a cleat.

The embodiments will now be described with reference to the accompanying drawings, wherein like reference numerals designate corresponding or identical elements throughout the various drawings.

First Embodiment

Referring initially to FIG. 1, a bicycle pedal 10 in accordance with a first embodiment comprises a pedal axle 12 a first pedal body 14, a second pedal body 16, a first cleat engagement member 18, and a second cleat engagement member 20. The pedal axle 12 is configured to be secured to a crank arm (not shown). In this embodiment, the bicycle pedal 10 is a right pedal configured to be attached to a right crank arm. However, structures of the bicycle pedal 10 can be applied to a left pedal configured to be attached to a left crank arm. The bicycle pedal 10 can be used as both a clipless pedal and a flat pedal.

Figure 2:
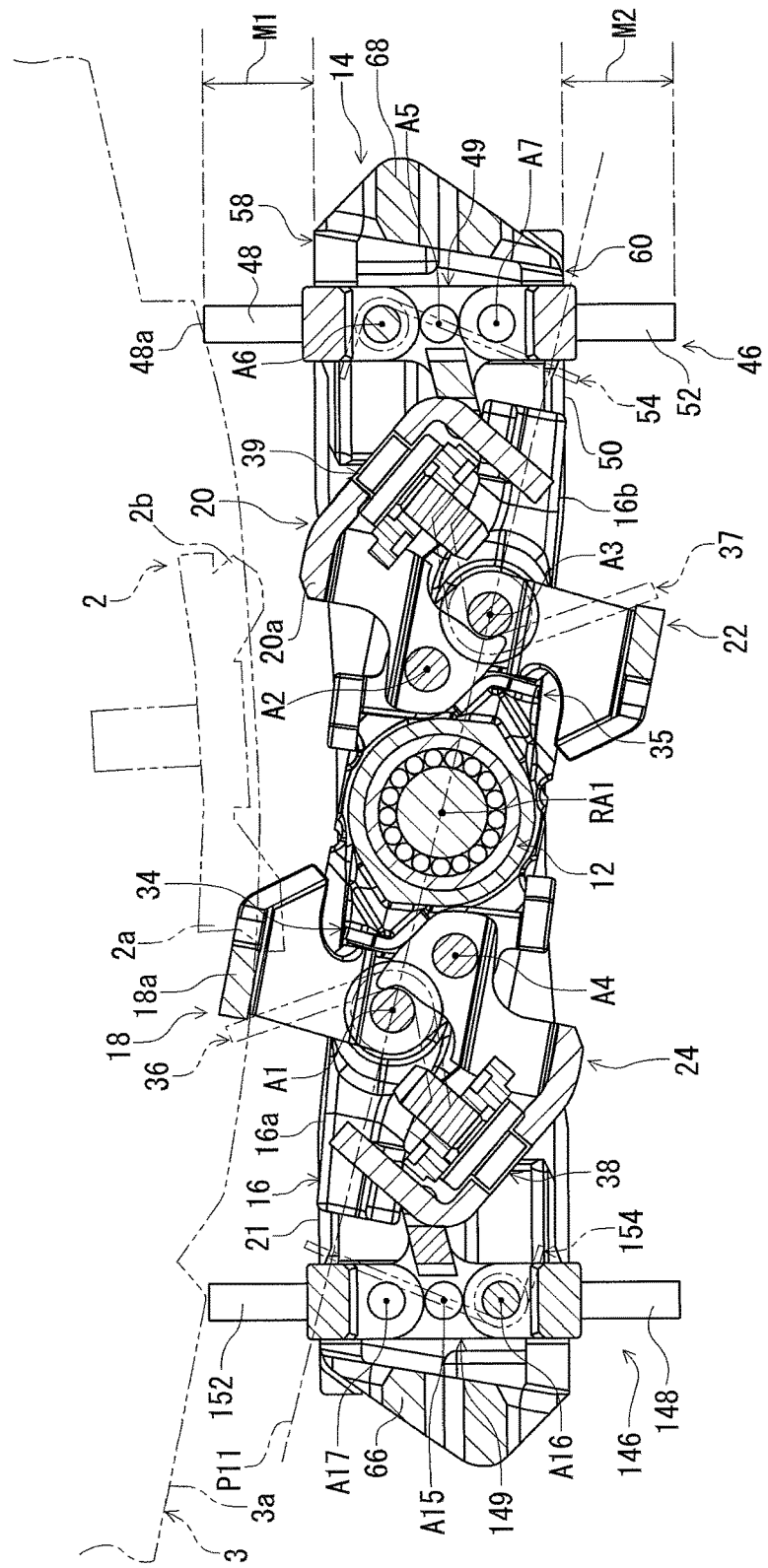
FIG. 2 is a cross-sectional view of the bicycle pedal illustrated in FIG. 1 (first position).
Figure 3:
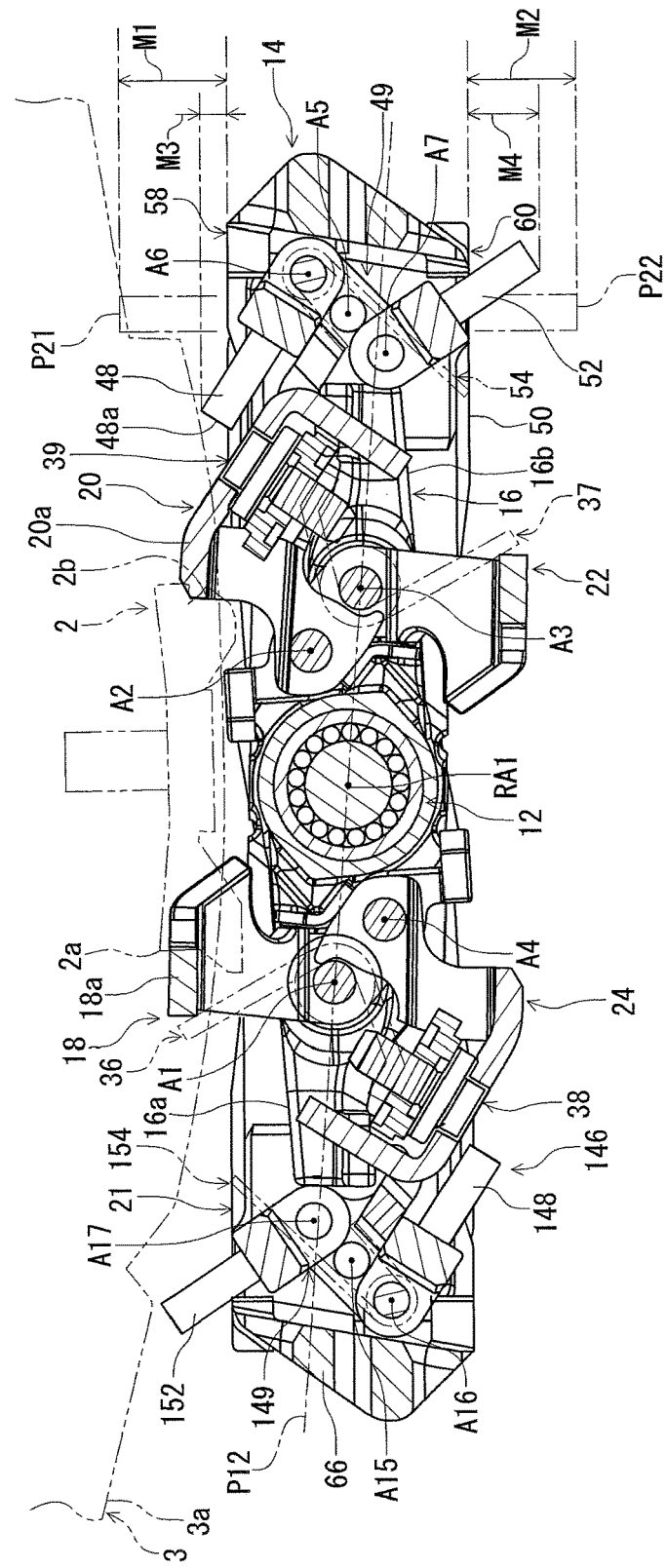
FIG. 3 is a cross-sectional view of the bicycle pedal illustrated in FIG. 1 (second position).

As seen in FIGS. 2 and 3, the first cleat engagement member 18 and the second cleat engagement member 20 are configured to be engaged with a cleat 2 attached to a shoe 3 to couple the cleat 2 to the second pedal body 16. In the illustrated embodiment, the first cleat engagement member 18 is a front cleat engagement member configured to be engaged with a front end 2a of the cleat 2. The second cleat engagement member 20 is a rear cleat engagement member configured to be engaged with a rear end 2b of the cleat 2. However, the first cleat engagement member 18 can be the rear cleat engagement member, and the second cleat engagement member 20 can be the front cleat engagement member.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle (not shown) with facing a handlebar (not shown). Accordingly, these terms, as utilized to describe the bicycle pedal 10, should be interpreted relative to the bicycle equipped with the bicycle pedal 10 as used in an upright riding position on a horizontal surface.

As seen in FIGS. 2 and 3, the first pedal body 14 includes a first surface 21. The first surface 21 is configured to face a sole 3a of the shoe 3 in a state where the cleat 2 attached to the sole 3a of the shoe 3 is secured to the bicycle pedal 10. The first pedal body 14 includes a second surface 50 opposite to the first surface 21. The second pedal body 16 includes a third surface 16a and a fourth surface 16b. The third surface 16a faces the same side as the first surface 21. The fourth surface 16b is opposite to the third surface 16a. The pedal axle 12 has a rotational axis RA1. The first pedal body 14 is configured to be rotatably coupled to the pedal axle 12 about the rotational axis RA1. The second pedal body 16 is configured to be rotatably coupled to the pedal axle 12 about the rotational axis RA1. The first cleat engagement member 18 is configured to be coupled to the second pedal body 16. The second cleat engagement member 20 is configured to be coupled to the second pedal body 16.

Figure 4:
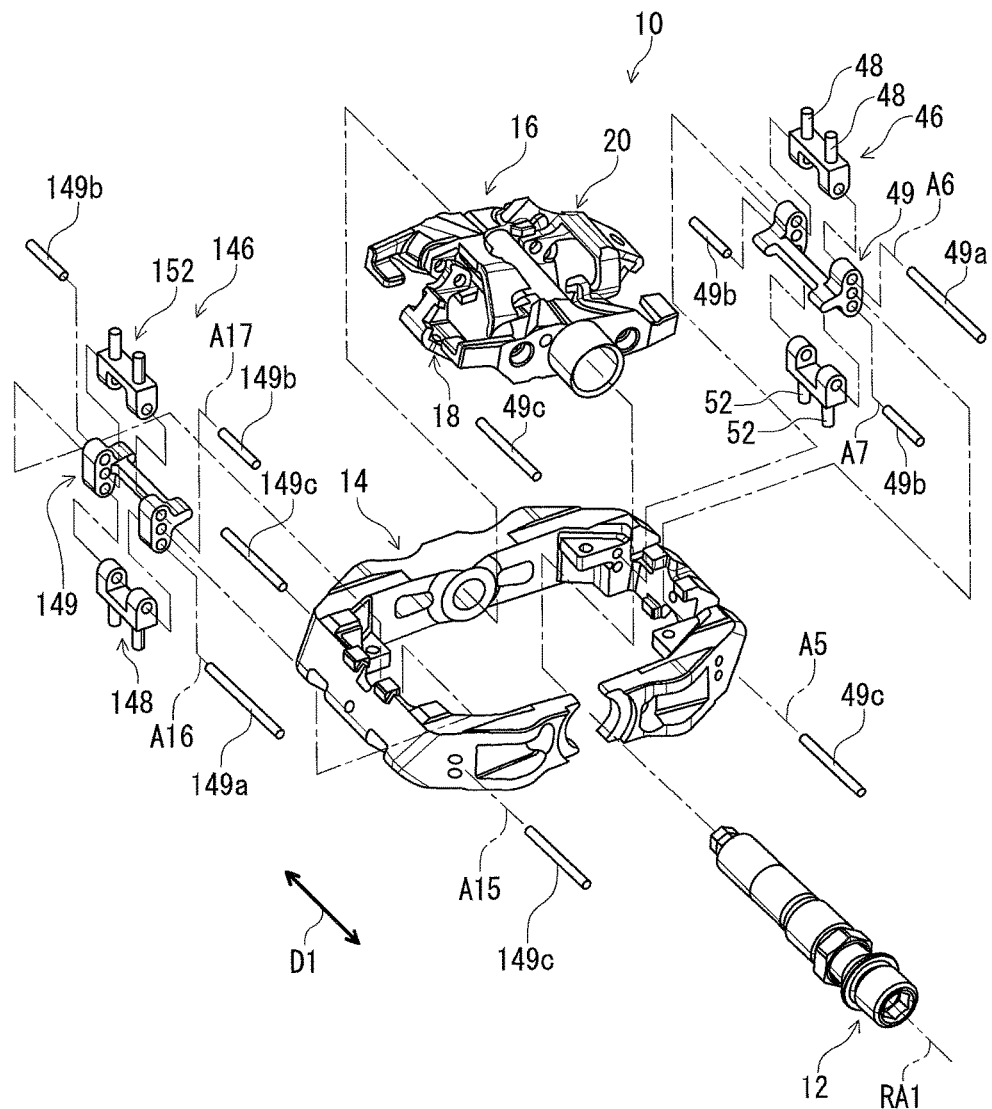
FIG. 4 is an exploded perspective view of the bicycle pedal illustrated in FIG. 1.

As seen in FIG. 4, the second pedal body 16 is configured to be rotatably supported on the pedal axle 12 about the rotational axis RA1. The first pedal body 14 is configured to be rotatably supported on the second pedal body 16 about the rotational axis RA1. However, the first pedal body 14 can be configured to be rotatably supported on the pedal axle 12 about the rotational axis RA1. The second pedal body 16 can be configured to be rotatably supported on the first pedal body 14 about the rotational axis RA1.

Figure 5:
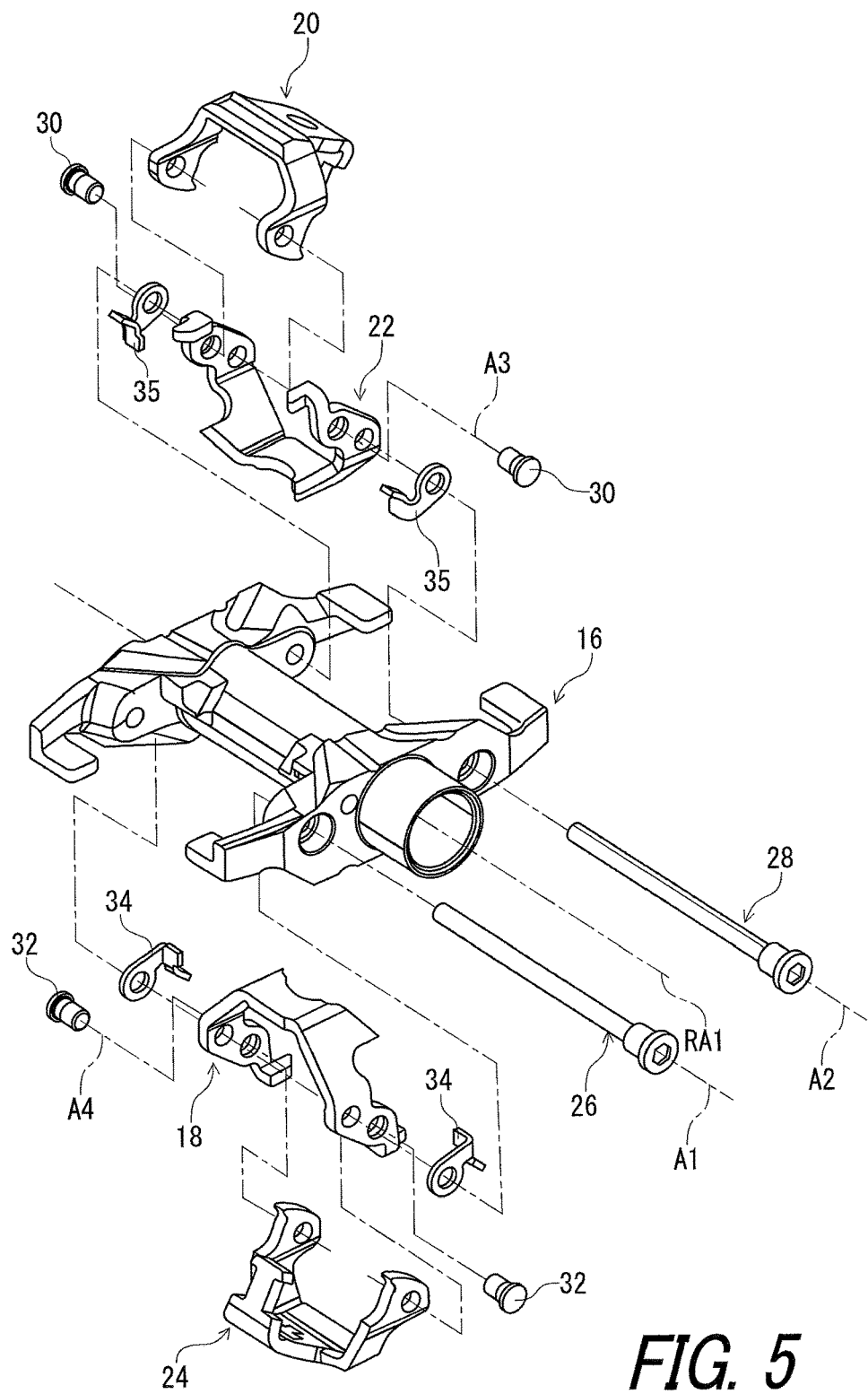
FIG. 5 is a partial exploded perspective view of the bicycle pedal illustrated in FIG. 1.

As seen in FIG. 5, the first cleat engagement member 18 is configured to be pivotally coupled to the second pedal body 16 about a first pivot axis A1. The second cleat engagement member 20 is configured to be pivotally coupled to the second pedal body 16 about a second pivot axis A2.

The bicycle pedal 10 comprises a third cleat engagement member 22 and a fourth cleat engagement member 24. The third cleat engagement member 22 is pivotally coupled to the second pedal body 16 about the second pivot axis A2. The second cleat engagement member 20 is pivotally coupled to the third cleat engagement member 22 about a third pivot axis A3. The second cleat engagement member 20 is pivotally coupled to the second pedal body 16 about the second pivot axis A2 via the third cleat engagement member 22. The fourth cleat engagement member 24 is pivotally coupled to the first cleat engagement member 18 about a fourth pivot axis A4. The fourth cleat engagement member 24 is pivotally coupled to the second pedal body 16 about the first pivot axis A1 via the first cleat engagement member 18.

The third cleat engagement member 22 has substantially the same structure as that of the first cleat engagement member 18. The fourth cleat engagement member 24 has substantially the same structure as that of the second cleat engagement member 20. The third cleat engagement member 22 and the fourth cleat engagement member 24 are configured to be engaged with the cleat 2 attached to the shoe 3 to couple the cleat 2 to the second pedal body 16. In the illustrated embodiment, the third cleat engagement member 22 is a front cleat engagement member configured to engage with a front end 2a of the cleat 2. The fourth cleat engagement member 24 is a rear cleat engagement member configured to engage with a rear end 2b of the cleat 2. However, the third cleat engagement member 22 can be a rear cleat engagement member, and the fourth cleat engagement member 24 can be a front cleat engagement member.

The bicycle pedal 10 comprises a first pivot axle 26, a second pivot axle 28, a pair of first pivot pins 30, and a pair of second pivot pins 32. The first pivot axle 26 and the second pivot axle 28 are attached to the second pedal body 16. The first cleat engagement member 18 is pivotally coupled to the second pedal body 16 via the first pivot axle 26. The first pivot axle 26 defines the first pivot axis A1. The third cleat engagement member 22 is pivotally coupled to the second pedal body 16 via the second pivot axle 28. The second pivot axle 28 defines the second pivot axis A2.

The first pivot pins 30 are attached to the third cleat engagement member 22. The second cleat engagement member 20 is pivotally coupled to the third cleat engagement member 22 via the first pivot pins 30. The first pivot pins 30 define the third pivot axis A3. The second pivot pins 32 are attached to the first cleat engagement member 18. The fourth engagement member is pivotally coupled to the first cleat engagement member 18 via the second pivot pins 32. The second pivot pins 32 define the fourth pivot axis A4.

The bicycle pedal 10 comprises a pair of first receiving members 34 and a pair of second receiving members 35. The first receiving members 34 are pivotally coupled to the second pedal body 16 about the first pivot axis A1 via the first pivot axle 26. The second receiving members 35 are pivotally coupled to the second pedal body 16 about the second pivot axis A2 via the second pivot axle 28.

As seen in FIG. 2, the first receiving members 34 are provided between the second pedal body 16 and the first cleat engagement member 18. The second receiving members 35 are provided between the second pedal body 16 and the third cleat engagement member 22.

The bicycle pedal 10 comprises a first biasing element 36, and a second biasing element 37. The first biasing element 36 is configured to bias the first cleat engagement member 18 toward the second cleat engagement member 20. The second biasing element 37 is configured to bias the second cleat engagement member 20 toward the first cleat engagement member 18. The first biasing element 36 is configured to bias the fourth cleat engagement member 24 toward the third cleat engagement member 22. The second biasing element 37 is configured to bias the third cleat engagement member 22 toward the fourth cleat engagement member 24.

The bicycle pedal 10 comprises a first adjustment structure 38 and a second adjustment structure 39. The first adjustment structure 38 is mounted to the fourth cleat engagement member 24 for adjusting a rotational force applied from the first biasing element 36 to the first cleat engagement member 18 and the fourth cleat engagement member 24. The second adjustment structure 39 is mounted to the second cleat engagement member 20 for adjusting a rotational force applied from the second biasing element 37 to the second cleat engagement member 20 and the third cleat engagement member 22.

Figure 6:
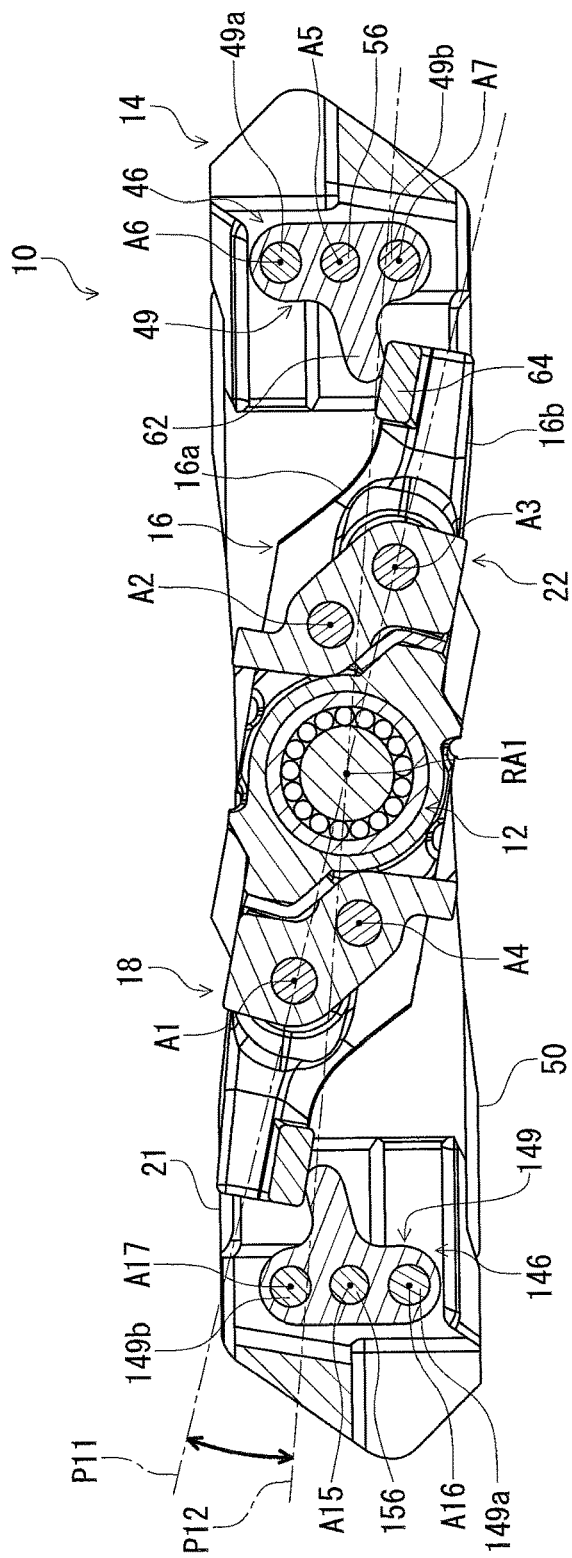
FIG. 6 is a cross-sectional view of the bicycle pedal illustrated in FIG. 1 (first position).
Figure 7:
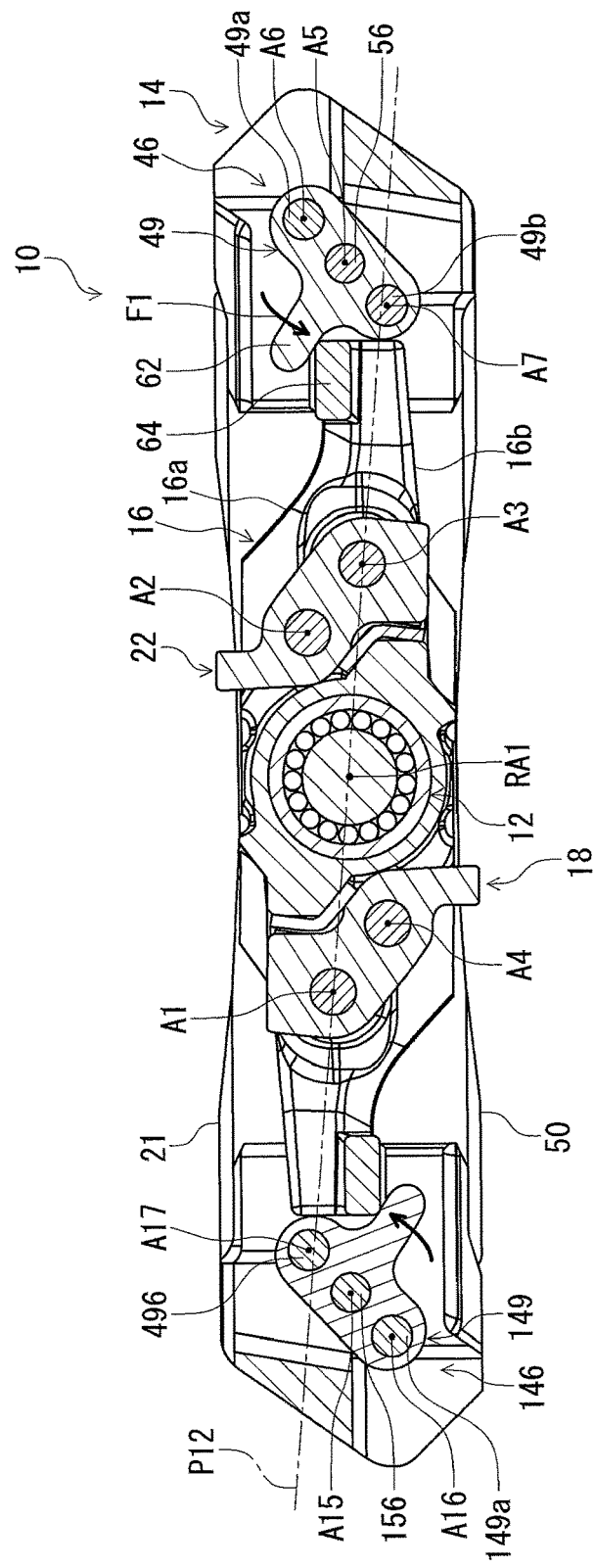
FIG. 7 is a cross-sectional view of the bicycle pedal illustrated in FIG. 1 (second position).

As seen in FIGS. 6 and 7, the second pedal body 16 is pivotable relative to the first pedal body 14 about the rotational axis RA1 between a first position P11 and a second position P12. In this embodiment, the first position P11 and the second position P12 are defined based on the first pivot axis A1 and the third pivot axis A3. In a first state where the second pedal body 16 is positioned at the first position P11 relative to the first pedal body 14, the cleat 2 (FIG. 2) is not engaged with the first cleat engagement member 18 and the second cleat engagement member 20. In a second state where the second pedal body 16 is positioned at the second position P12 relative to the first pedal body 14, the cleat 2 (FIG. 2) is engaged with the first cleat engagement member 18 and the second cleat engagement member 20. The first cleat engagement member 18 more largely protrudes from the first surface 21 of the first pedal body 14 in the first state than in the second state.

Figure 8:
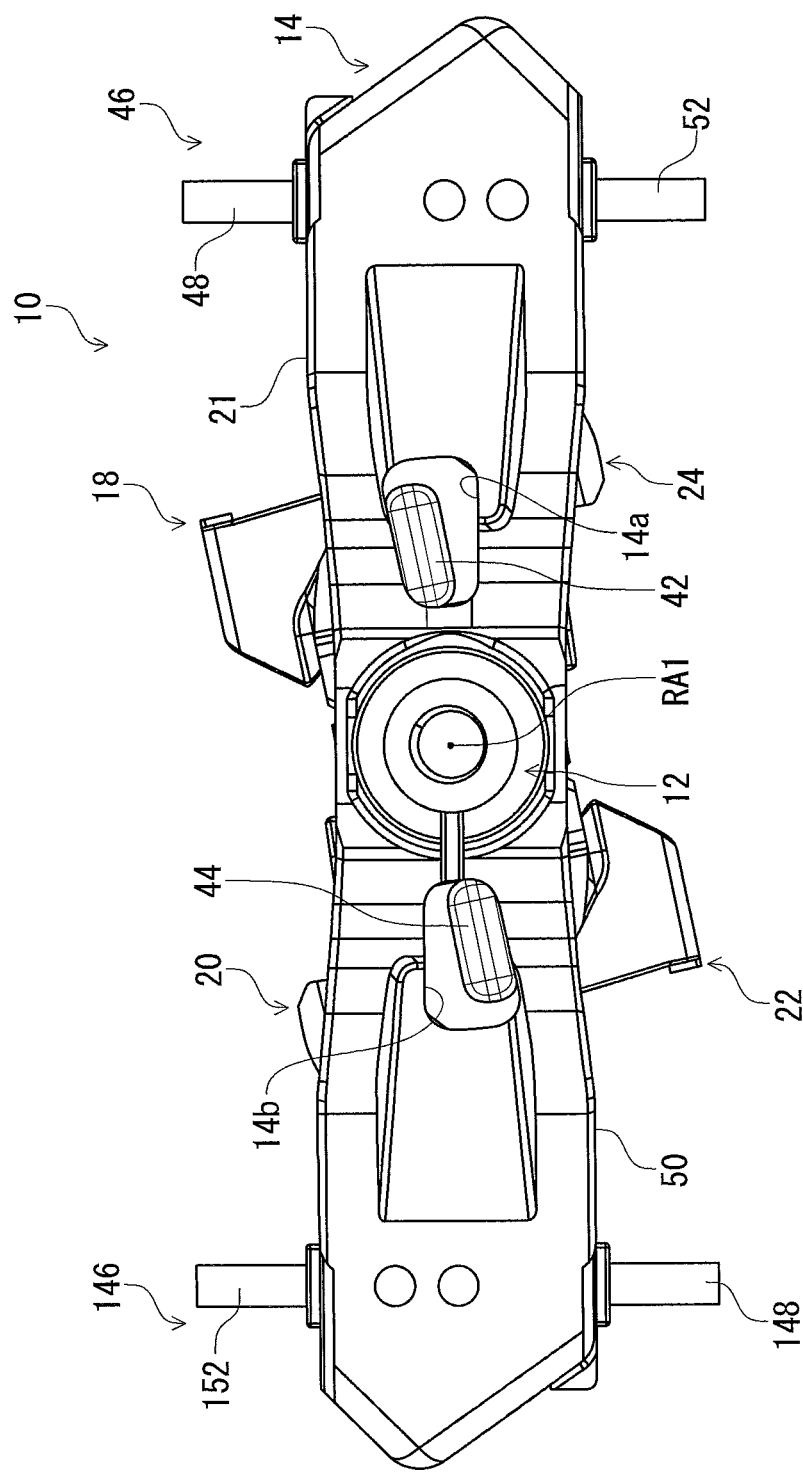
FIG. 8 is a side elevational view of the bicycle pedal illustrated in FIG. 1 (first position).

As seen in FIG. 8, the first pedal body 14 includes a first opening 14a and a second opening 14b. The second pedal body 16 includes a first stopper 42 and a second stopper 44. The first stopper 42 is movably provided in the first opening 14a. The second stopper 44 is movably provided in the second opening 14b. The first stopper 42, the second stopper 44, the first opening 14a, and the second opening 14b define the first and second positions P11 and P12 of the second pedal body 16. At least one of the first opening 14a and the second opening 14b can be omitted from the first pedal body 14. At least one of the first stopper 42 and the second stopper 44 can be omitted from the second pedal body 16.

As seen in FIG. 4, the bicycle pedal 10 comprises a gripping member 46 configured to be movably coupled to the first pedal body 14. In the illustrated embodiment, the gripping member 46 can also be referred to as a biasing force transmitting member 46. The biasing force transmitting member 46 is rotatably disposed about the pivot axis A5.

As seen in FIG. 2, the gripping member 46 includes a first gripping portion 48. While the gripping member 46 includes two first gripping portions 48 in this embodiment, a total number of the first gripping portions 48 is not limited to this embodiment. The first gripping portion 48 is configured to protrude from the first surface 21 when viewed from an axial direction D1 (FIG. 4) parallel to the rotational axis RA1 in a first state where the second pedal body 16 is positioned at the first position P11 relative to the first pedal body 14. The first gripping portion 48 is configured to contact the sole 3a of the shoe 3 to increase a frictional resistance between the first gripping portion 48 and the sole 3a in a state where the cleat 2 is not secured to the bicycle pedal 10. The gripping member 46 can reduce slip between the sole 3a of the shoe 3 and the bicycle pedal 10 in a state where the cleat 2 is not secured to the bicycle pedal 10 via the first cleat engagement member 18 and the second cleat engagement member 20.

As seen in FIG. 3, the first gripping portion 48 is configured to protrude from the first surface 21 when viewed from the axial direction D1 (FIG. 4) in a second state where the second pedal body 16 is positioned at the second position P12 relative to the first pedal body 14. However, the first gripping portion 48 can be configured not to protrude from the first surface 21 in the second state of the second pedal body 16 when viewed from the axial direction D1 (FIG. 4).

As seen in FIG. 4, the gripping member 46 includes a support portion 49 pivotable relative to the first pedal body 14 about a pivot axis A5 substantially parallel to the rotational axis RA1. The first gripping portion 48 is pivotally coupled to the support portion 49 about a first additional pivot axis A6 different from the pivot axis A5. In this embodiment, the first gripping portion 48 is pivotally coupled to the support portion 49 via a first pivot shaft 49a. The pivot axis A5 is different from the rotational axis RA1 and is spaced apart from the rotational axis RA1. The first additional pivot axis A6 is substantially parallel to the pivot axis A5 and is spaced apart from the pivot axis A5. However, the pivot axis A5 can be non-parallel to the rotational axis RA1. The first additional pivot axis A6 can be non-parallel to the pivot axis A5.

The bicycle pedal 10 further comprises a pivot shaft 49c configured to pivotally couple the gripping member 46 to the first pedal body 14 about the pivot axis A5 substantially parallel to the rotational axis RA1. The pivot shaft 49c is configured to be attached to the first pedal body 14. In this embodiment, the support portion 49 is pivotally coupled to the first pedal body 14 about the pivot axis A5 via a pair of pivot shafts 49c.

As seen in FIG. 2, the first pedal body 14 includes the second surface 50 opposite to the first surface 21. The gripping member 46 includes a second gripping portion 52. While the gripping member 46 includes two second gripping portions 52 in this embodiment, a total number of the second gripping portion 52 is not limited to this embodiment. The second gripping portion 52 is configured to protrude from the second surface 50 when viewed from the axial direction D1 in the first state of the second pedal body 16. The second gripping portion 52 is configured to contact the sole 3a of the shoe 3 in a state where the second surface 50 upwardly faces. The second gripping portion 52 is configured to contact the sole 3a of the shoe 3 to increase a frictional resistance between the second gripping portion 52 and the sole 3a in a state where the cleat 2 is not secured to the bicycle pedal 10. The gripping member 46 can reduce slip between the sole 3a of the shoe 3 and the bicycle pedal 10 in a state where the cleat 2 is not secured to the bicycle pedal 10 via the third cleat engagement member 22 and the fourth cleat engagement member 24.

As seen in FIG. 3, the second gripping portion 52 is configured to protrude from the second surface 50 when viewed from the axial direction D1 in a second state where the second pedal body 16 is positioned at the second position P12 relative to the first pedal body 14. However, the second gripping portion 52 can be configured not to protrude from the second surface 50 in the second state of the second pedal body 16 when viewed from the axial direction D1.

As seen in FIG. 4, the second gripping portion 52 is pivotally coupled to the support portion 49 about a second additional pivot axis A7 different from the pivot axis A5 and the first additional pivot axis A6. The pivot axis A5 is provided between the first additional pivot axis A6 and the second additional pivot axis A7 when viewed from the axial direction D1. In this embodiment, the second gripping portion 52 is pivotally coupled to the support portion 49 via second pivot shaft 49b. The second additional pivot axis A7 is substantially parallel to the pivot axis A5 and the first additional pivot axis A6 and is spaced apart from the pivot axis A5 and the first additional pivot axis A6. However, the second additional pivot axis A71 can be non-parallel to the pivot axis A5 and the first additional pivot axis A6.

As seen in FIG. 2, the first gripping portion 48 protrudes from the first surface 21 by a first amount of protrusion M1 when viewed from the axial direction D1 in a first grip state where the gripping member 46 is positioned at the first grip position P21 relative to the first pedal body 14. The second gripping portion 52 protrudes from the second surface 50 by a second amount of protrusion M2 when viewed from the axial direction D1 in the first grip state of the gripping member 46. The second amount of protrusion M2 is substantially equal to the first amount of protrusion M1. Specifically, in this embodiment, the second amount of protrusion M2 is equal to the first amount of protrusion M1. However, the second amount of protrusion M2 can be different from the first amount of protrusion M1.

As seen in FIG. 3, the first gripping portion 48 protrudes from the first surface 21 by a third amount of protrusion M3 when viewed from the axial direction D1 in the second grip state where the gripping member 46 is positioned at the second grip position P22 relative to the first pedal body 14. The third amount of protrusion M3 is smaller than the first amount of protrusion M1.

The second gripping portion 52 protrudes from the second surface 50 by a fourth amount of protrusion M4 when viewed from the axial direction D1 in the second grip state where the gripping member 46 is positioned at the second grip position P22 relative to the first pedal body 14. The fourth amount of protrusion M3 is smaller than the second amount of protrusion M2. The fourth amount of protrusion M4 is larger than the third amount of protrusion M3. However, the fourth amount of protrusion M4 can be equal to or smaller than the third amount of protrusion M3.

As seen in FIGS. 2 and 3, the bicycle pedal 10 comprises a biasing member 54. The biasing member 54 is configured to bias the second pedal body 16 toward the first position P11. The biasing member 54 is configured to bias the gripping member 46 such that, in response to a pivotal movement of the second pedal body 16 from the first position P11 to the second position P12, a tip end 48a of the first gripping portion 48 is moved toward the first surface 21 when viewed from the axial direction D1.

Figure 9:
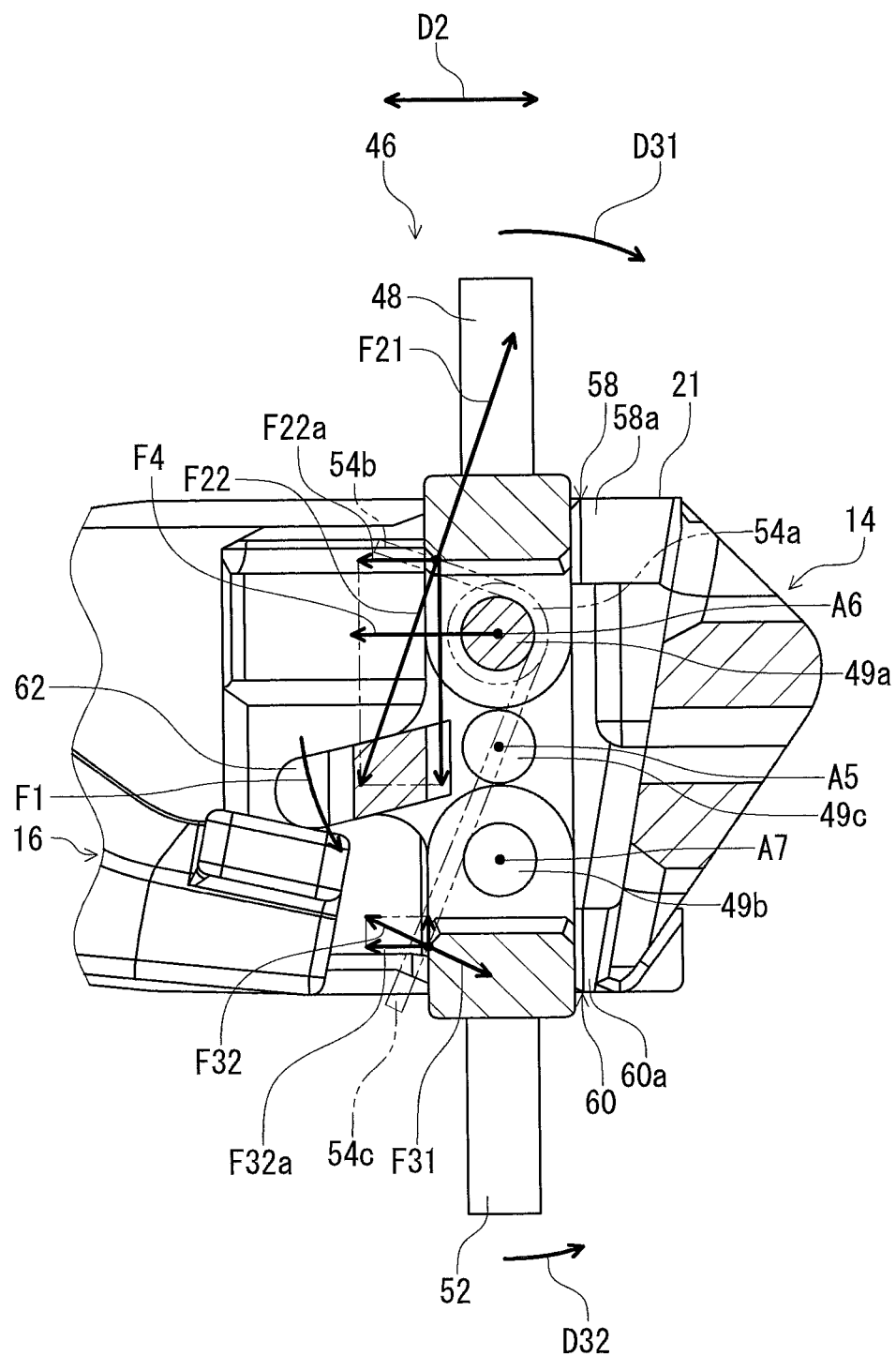
FIG. 9 is a partial cross-sectional view of the bicycle pedal illustrated in FIG. 1 (first position).

As seen in FIG. 9, the biasing member 54 includes a coiled body 54a. The coiled body 54a surrounds the first additional pivot axis A6 when viewed from the axial direction D1. The biasing member 54 includes a first end 54b and a second end 54c. The first end 54b extends from the coiled body 54a and is engaged with the first gripping portion 48 to transmit a biasing force F1 to the first gripping portion 48. The second end 54c extends from the coiled body 54a and is engaged with the second gripping portion 52 to transmit the biasing force F1 to the second gripping portion 52. In this embodiment, the first gripping portion 48 is pivoted by the biasing member 54 about the first additional pivot axis A6 in a first pivot direction D31. The second gripping portion 52 is pivoted by the biasing member 54 about the second additional pivot axis A7 in a second pivot direction D32 opposite to the first pivot direction D31.

Figure 10:
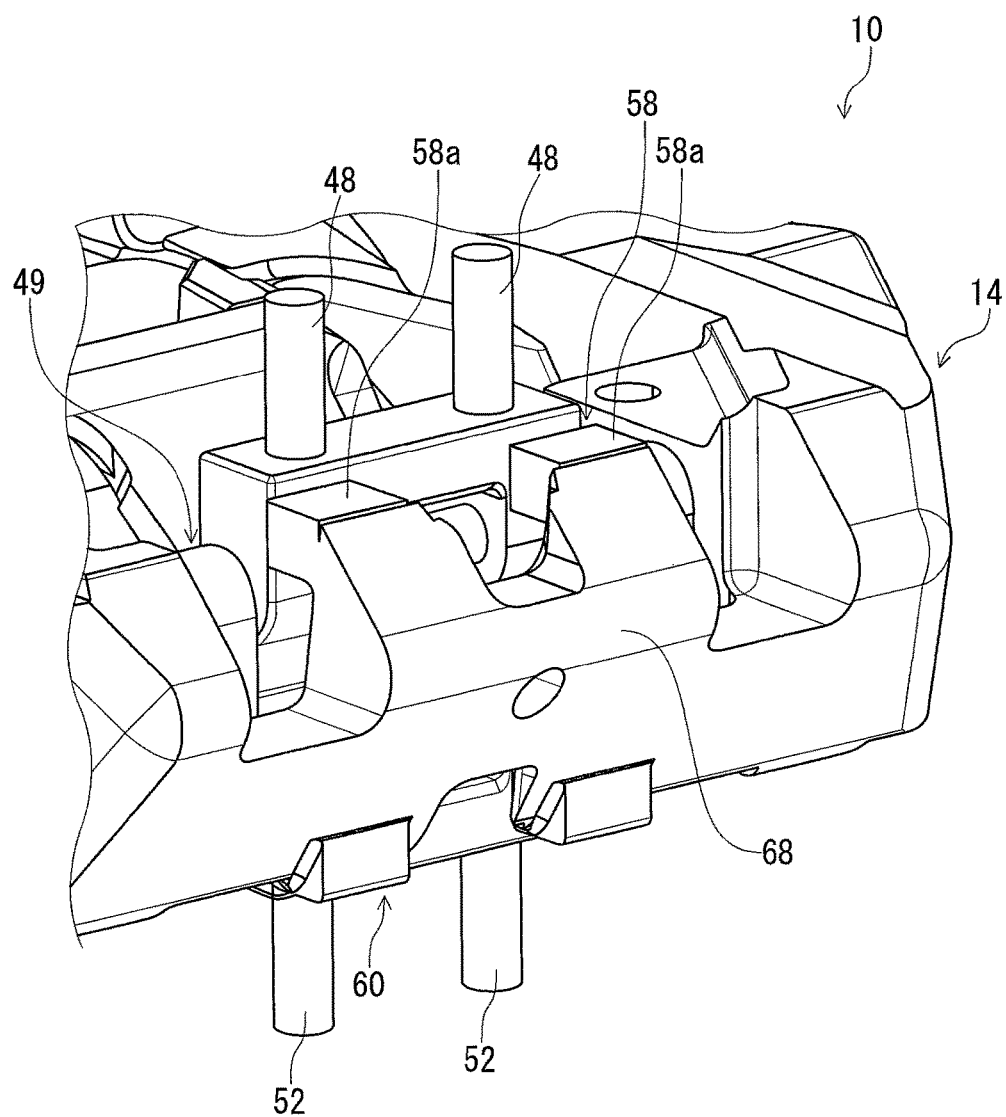
FIG. 10 is a partial perspective view of the bicycle pedal illustrated in FIG. 1.

As seen in FIG. 10, the first pedal body 14 includes a first guide portion 58. The first guide portion 58 is configured to guide the first gripping portion 48 when the first gripping portion 48 pivots relative to the support portion 49 about the first additional pivot axis A6. In this embodiment, the first guide portion 58 includes a pair of first guide parts 58a spaced apart from each other. As seen in FIG. 2, the first guide portion 58 does not protrude from the first surface 21 when viewed from the axial direction D1.

Figure 11:
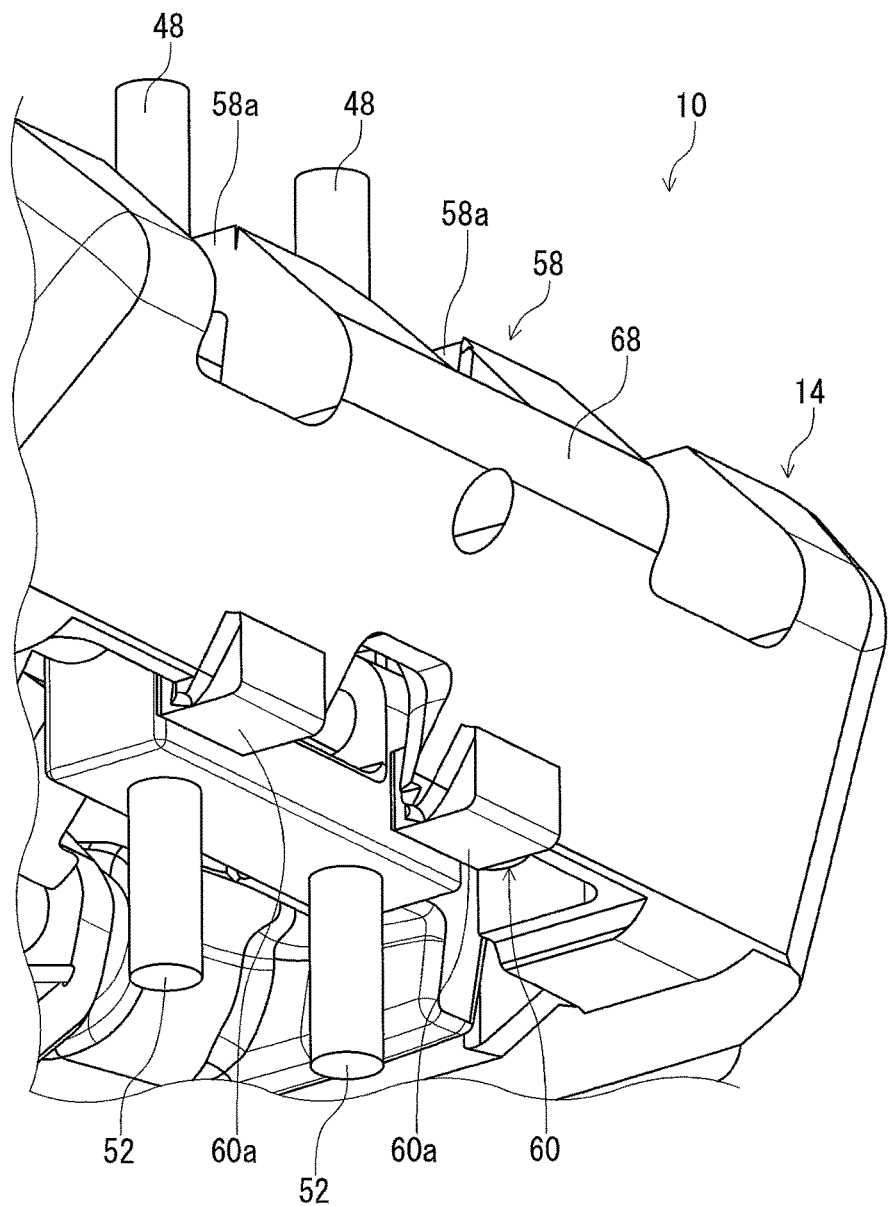
FIG. 11 is a partial perspective view of the bicycle pedal illustrated in FIG. 1.
Figure 12:
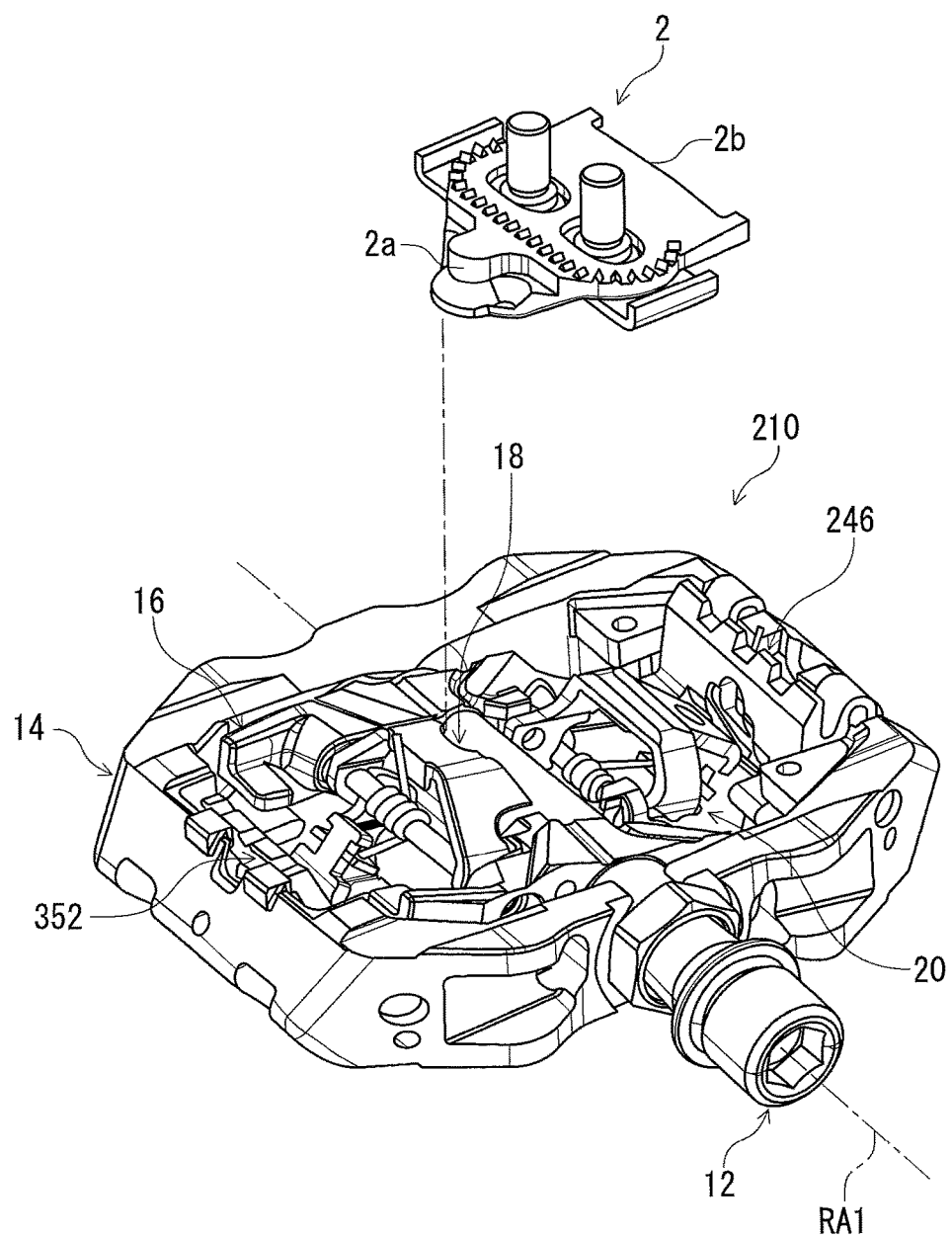
FIG. 12 is a perspective view of a bicycle pedal in accordance with a second embodiment, with a cleat.

As seen in FIG. 11, the first pedal body 14 includes a second guide portion 60. The second guide portion 60 is configured to guide the second gripping portion 52 when the second gripping portion 52 pivots relative to the support portion 49 about the second additional pivot axis A7. In this embodiment, the second guide portion 60 includes a pair of second guide parts 60a spaced apart from each other. As seen in FIG. 2, the second guide portion 60 does not protrude from the second surface 50 when viewed from the axial direction D1.

As seen in FIG. 9, a first biasing force F21 is applied from the biasing member 54 to the first gripping portion 48 via the first end 54b. A second biasing force F31 is applied from the biasing member 54 to the second gripping portion 52 via the second end 54c. The first gripping portion 48 is pressed against the first guide portion 58 by the first biasing force F21. The second gripping portion 52 is pressed against the second guide portion 60 by the second biasing force F31.

A first reaction force F22 is applied from the first gripping portion 48 to the biasing member 54 because of the first biasing force F21. A second reaction force F32 is applied from the second gripping portion 52 to the biasing member 54 because of the second biasing force F31. The first reaction force F22 includes a first component force F22a defined in an extending direction D2 which is substantially parallel to the first surface 21 of the first pedal body 14. The second reaction force F32 includes a second component force F32a defined in the extending direction D2. Thus, a total force F4 of the first and second component forces F22a and F32a is applied to the first pivot shaft 49a, and a rotational force occurs around the pivot axis A5. The biasing force F1 is applied to the support portion 49 because of the total force F4.

As seen in FIGS. 6 and 7, the biasing force transmitting member 46 is configured to contact the second pedal body 16 to transmit the biasing force F1 of the biasing member 54 to the second pedal body 16. The gripping member 46 includes a transmitting portion 62 configured to transmit a rotational force applied to the second pedal body 16 to the gripping member 46. In this embodiment, the transmitting portion 62 is protruding toward the second pedal body 16 as viewed from the axial direction D1. The biasing member 54 (FIG. 2) is configured to bias the second pedal body 16 toward the first position P11 via the transmitting portion 62. The biasing member 54 (FIG. 2) is configured to apply the biasing force F1 to the second pedal body 16 via the transmitting portion 62. The second pedal body 16 includes a receiving portion 64 contacting the transmitting portion 62. In this embodiment, the receiving portion 64 is formed on an end of the third surface 16a of the second pedal body 16 as viewed from the axial direction D1. In this embodiment, the biasing force F1 is transmitted from the biasing member 54 to the second pedal body 16 via the biasing force transmitting member 46. However, the biasing force F1 can be directly transmitted from the biasing member 54 to the second pedal body 16 without via another member such as the biasing force transmitting member 46.

In this embodiment, the biasing force transmitting member 46 (the gripping member 46) includes the first gripping portion 48, the support portion 49, and the second gripping portion 52. However, at least one of the first gripping portion 48, the support portion 49, and the second gripping portion 52 can be omitted from the biasing force transmitting member 46. The biasing force transmitting member 46 can only be configured to transmit the biasing force F1 from the biasing member 54 to the second pedal body 16.

As seen in FIG. 2, the first pedal body 14 includes a first part 66 and a second part 68 opposite to the first part 66 relative to the rotational axis RA1. The first cleat engagement member 18 is closer to the first part 66 than to the second part 68. The second cleat engagement member 20 is closer to the second part 68 than to the first part 66. The first gripping portion 48 is closer to the second part 68 than to the first part 66. The second gripping portion 52 is closer to the second part 68 than to the first part 66. The second cleat engagement member 20 is closer to the first gripping portion 48 than the first cleat engagement member 18. The second cleat engagement member 20 is provided between the first cleat engagement member 18 and the gripping member 46 as viewed from the axial direction D1.

As seen in FIG. 2, as viewed from the axial direction D1, the tip end 48a of the first gripping portion 48 is provided above the second cleat engagement member 20 when the first surface 21 upwardly faces in the first state of the second pedal body 16. As viewed from the axial direction D1. An uppermost end 18*a* of the first cleat engagement member 18 is provided above an uppermost end 20*a* of the second cleat engagement member 20 when the first surface 21 upwardly faces in the first state of the second pedal body 16.

As seen in FIG. 3, as viewed from the axial direction D1, the uppermost end 20*a* of the second cleat engagement member 20 is provided above the first gripping portion 48 when the first surface 21 upwardly faces in the second state where the second pedal body 16 is positioned at the second position P12 relative to the first pedal body 14.

As seen in FIGS. 2 to 9, the bicycle pedal 10 comprises a gripping member 146, a biasing member 154, pivot pins 149*a* and 149*b*, and pivot shafts 149*c*. The gripping member 146 includes a first gripping portion 148, a support portion 149, and a second gripping portion 152. The gripping member 146, the biasing member 154, the pivot pins 149*a* and 149*b*, and the pivot shaft 149*c* have substantially the same structures as those of the gripping member 46, the biasing member 54, the pivot pins 49*a* and 49*b*, and the pivot shafts 49*c*, respectively. The first gripping portion 148, the support portion 149, and the second gripping portion 152 have substantially the same structures as those of the first gripping portion 48, the support portion 49, and the second gripping portion 52, respectively. A pivot axis A15, a first additional pivot axis A16, and a second additional pivot axis A17 have substantially the same constructions as those of the pivot axis A5, the first additional pivot axis A6, and the second additional pivot axis A7. Thus, they will not be described and/or illustrated in detail here for the sake of brevity.

The features of the bicycle pedal 10 are summarized as follows.

(1) The gripping member 46 is configured to be movably coupled to the first pedal body 14. The gripping member 46 includes the first gripping portion 48 configured to protrude from the first surface 21 when viewed from the axial direction D1 in the first state where the second pedal body 16 is positioned at the first position P11 relative to the first pedal body 14. The biasing member 54 is configured to bias the gripping member 46 such that, in response to the pivotal movement of the second pedal body 16 from the first position P11 to the second position P12, the tip end 48*a* of the first gripping portion 48 is moved toward the first surface 21 when viewed from the axial direction D1. Accordingly, it is possible to move the first gripping portion 48 toward the first surface 21 in response to the pivotal movement of the second pedal body 16 from the first position P11 to the second position P12. This can reduce interference between the first gripping portion 48 and the sole 3*a* of the shoe 3 when the cleat 2 is secured to the first cleat engagement member 18 and the second cleat engagement member 20 (in the step-in operation), making the step-in operation of the bicycle pedal 10 smoother.

(2) The pivot shaft 49*c* is configured to pivotally couple the gripping member 46 to the first pedal body 14 about the pivot axis A5 substantially parallel to the rotational axis RA1. Accordingly, it is possible to support the gripping member 46 with a simple structure.

(3) The pivot shaft 49*c* is configured to be attached to the first pedal body 14. Accordingly, it is possible to support the gripping member 46 relative to the first pedal body 14 with a simple structure.

(4) The gripping member 46 includes the transmitting portion 62 configured to transmit the rotational force applied to the second pedal body 16 to the gripping member 46. Accordingly, it is possible to move the gripping member 46 in response to the movement of the second pedal body 16.

(5) The biasing member 54 is configured to bias the second pedal body 16 toward the first position P11 via the transmitting portion 62. Accordingly, it is possible to utilize the biasing member 54 to move the second pedal body 16 toward the first position P11. This can eliminate another biasing member to move the second pedal body 16 relative to the first pedal body 14 toward the first position P11.

(6) The gripping member 46 includes the second gripping portion 52 configured to protrude from the second surface 50 when viewed from the axial direction D1 in the first state of the second pedal body 16. Accordingly, it is possible to use the second gripping portion 52 to grip the sole 3*a* of the shoe 3 when the second surface 50 upwardly faces. This allows the gripping member 46 to grip the sole 3*a* of the shoe 3 when each of the first surface 21 and the second surface 50 upwardly faces.

(7) Since the second amount of protrusion M2 is substantially equal to the first amount of protrusion M1, the first gripping portion 48 and the second gripping portion 52 can respectively grip the sole 3*a* of the shoe 3 when the first surface 21 and the second surface 50 upwardly face.

(8) The second gripping portion 52 is pivotally coupled to the support portion 49 about the second additional pivot axis A7 different from the pivot axis A5 and the first additional pivot axis A6. The pivot axis A5 is provided between the first additional pivot axis A6 and the second additional pivot axis A7 when viewed from the axial direction D1. Accordingly, it is possible to move the first gripping portion 48 and the second gripping portion 52 relative to the first pedal body 14 in response to movement of the support portion 49.

(9) The coiled body 54*a* of the biasing member 54 surrounds the first additional pivot axis A6 when viewed from the axial direction D1. Accordingly, it is possible to apply a rotational force from the biasing member 54 to the support portion 49 by using the biasing force F1 of the biasing member 54.

(10) The first end 54*b* extends from the coiled body 54*a* and is engaged with the first gripping portion 48 to transmit the biasing force F1 to the first gripping portion 48. The second end 54*c* extends from the coiled body 54*a* and is engaged with the second gripping portion 52 to transmit the biasing force F1 to the second gripping portion 52. Accordingly, it is possible to bias the first gripping portion 48 and the second gripping portion 52 with the biasing member 54.

(11) The first guide portion 58 is configured to guide the first gripping portion 48 when the first gripping portion 48 pivots relative to the support portion 49 about the first additional pivot axis A6. The second guide portion 60 is configured to guide the second gripping portion 52 when the second gripping portion 52 pivots relative to the support portion 49 about the second additional pivot axis A7. Accordingly, it is possible to stabilize movement of the first gripping portion 48 and the second gripping portion 52 with the first guide portion 58 and the second guide portion 60.

(12) The tip end 48*a* of the first gripping portion 48 is provided above the second cleat engagement member 20 when the first surface 21 upwardly faces in the first state of the second pedal body 16. Accordingly, it is possible to increase the gripping function of the first gripping portion 48 in the first state of the second pedal body 16.

(13) The uppermost end of the second cleat engagement member 20 is provided above the first gripping portion 48 when the first surface 21 upwardly faces in a second state where the second pedal body 16 is positioned at the second position P12 relative to the first pedal body 14. Accordingly, it is possible to restrict the first gripping portion 48 from inhibiting relative movement between the shoe 3 and the first pedal body 14 in the second state of the second pedal body 16. This allows the cleat 2 to be easily detached from the first cleat engagement member 18 and the second cleat engagement member 20.

(14) The uppermost end 18a of the first cleat engagement member 18 is provided above the uppermost end 20a of the second cleat engagement member 20 when the first surface 21 upwardly faces in the first state of the second pedal body 16. Accordingly, it is possible to easily bring the cleat into engagement with the first cleat engagement member 18.

(15) The biasing member 54 is configured to bias the second pedal body 16 toward the first position P11. The pivot shaft 49c is configured to support the biasing member 54 about the pivot axis A5 substantially parallel to the rotational axis RA1. The pivot shaft 49c is different from the rotational axis RA1. Accordingly, it is possible to bias the second pedal body 16 toward the first position P11 with a simple structure. Thus, it is possible to omit another biasing member provided on the rotational axis RA1 to bias the second pedal body 16 toward the first position P11.

(16) The biasing force transmitting member 46 is rotatably disposed about the pivot axis A5. The biasing force transmitting member 46 is configured to contact the second pedal body 16 to transmit the biasing force F1 of the biasing member 54 to the second pedal body 16. Accordingly, it is possible to effectively transmit the biasing force F1 to the second pedal body 16 via the biasing force transmitting member 46.

Second Embodiment

A bicycle pedal 210 in accordance with a second embodiment will be described below referring to FIGS. 12 to 20. The bicycle pedal 210 has the same structures as the bicycle pedal 10 except for the gripping member 46. Thus, elements having substantially the same function as those in the first embodiment will be numbered the same here, and will not be described and/or illustrated again in detail here for the sake of brevity.

As seen in FIGS. 12 to 15, the bicycle pedal 210 comprises a gripping member 246 configured to be movably coupled to the first pedal body 14. In the illustrated embodiment, the gripping member 246 can also be referred to as a biasing force transmitting member 246. The biasing force transmitting member 246 is rotatably disposed about the pivot axis A5. The gripping member 246 has substantially the same function as that of the gripping member 46 in the first embodiment. Unlike the gripping member 46, however, the gripping member 246 is a one-piece unitary member.

Figure 13:
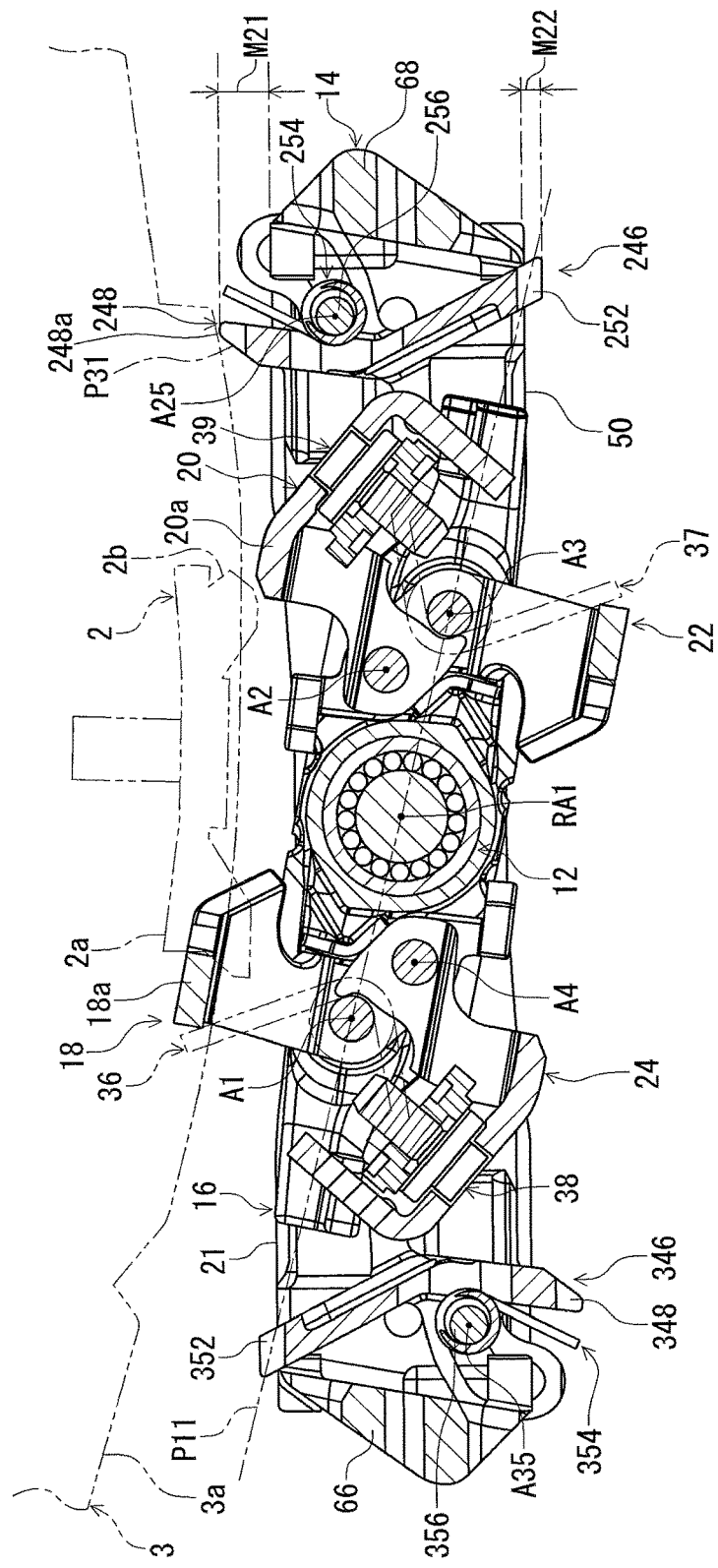
FIG. 13 is a cross-sectional view of the bicycle pedal illustrated in FIG. 12 (first position).

As seen in FIG. 13, the gripping member 246 includes a first gripping portion 248. The first gripping portion 248 is configured to protrude from the first surface 21 when viewed from the axial direction D1 (FIG. 15) parallel to the rotational axis RA1 in a first state where the second pedal body 16 is positioned at the first position P11 relative to the first pedal body 14. The gripping member 246 is positioned at a first grip position P31 relative to the first pedal body 14 in the first state where the second pedal body 16 is positioned at the first position P11 relative to the first pedal body 14.

The first gripping portion 248 is configured to contact the sole 3a of the shoe 3 to increase a frictional resistance between the first gripping member 248 and the sole 3a in a state where the cleat 2 is not secured to the bicycle pedal 210. The gripping member 246 can reduce slip between the sole 3a of the shoe 3 and the bicycle pedal 210 in a state where the cleat 2 is not secured to the bicycle pedal 10 via the first cleat engagement member 18 and the second cleat engagement member 20.

Figure 14:
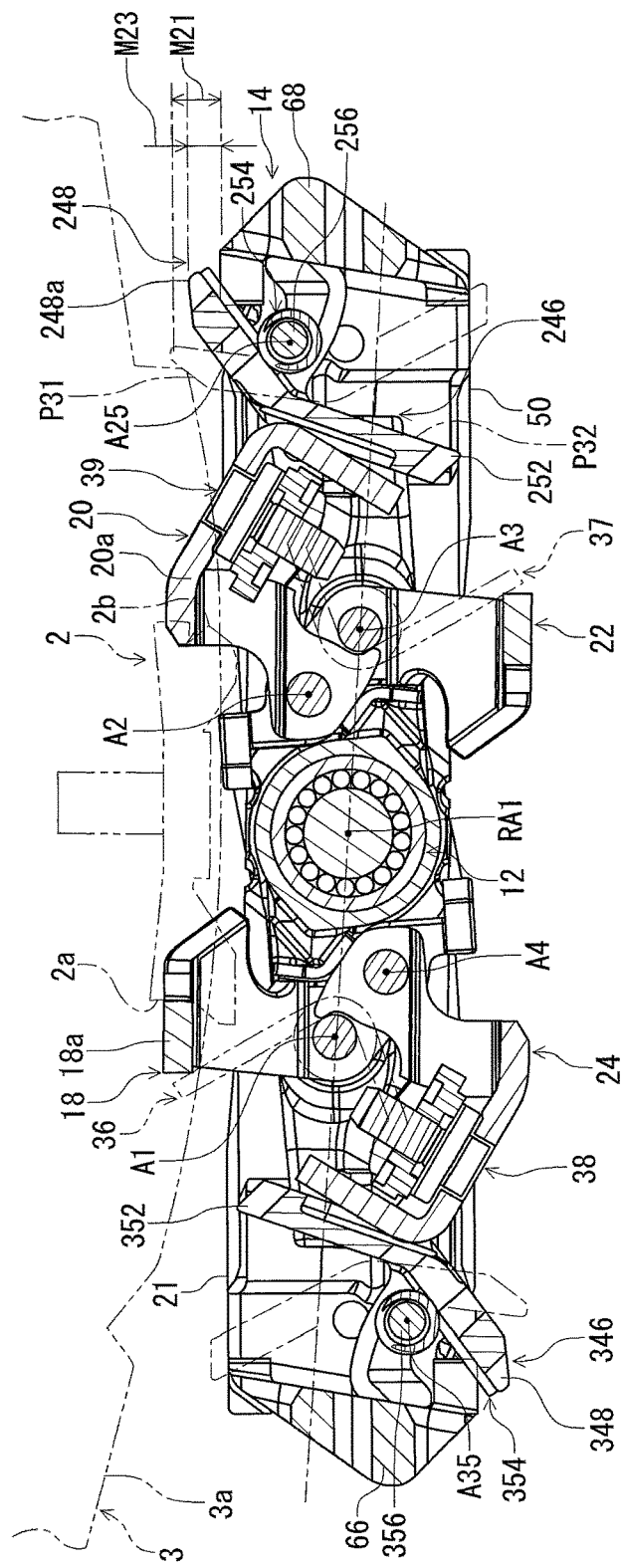
FIG. 14 is a cross-sectional view of the bicycle pedal illustrated in FIG. 12 (second position).
Figure 15:
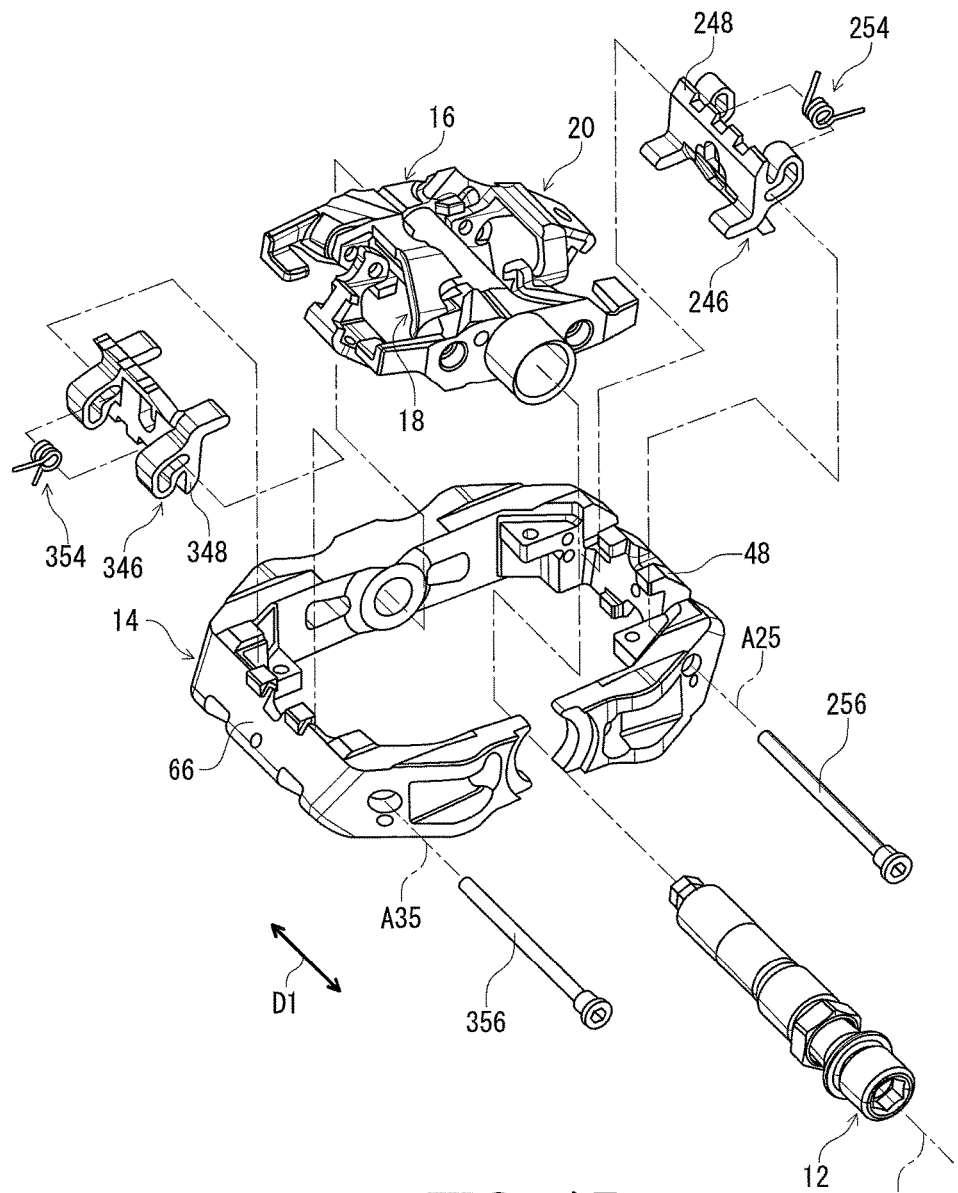
FIG. 15 is a partial exploded perspective view of the bicycle pedal illustrated in FIG. 12.

As seen in FIG. 14, the first gripping portion 248 is configured to protrude from the first surface 21 when viewed from the axial direction D1 in a second state where the second pedal body 16 is positioned at the second position P12 relative to the first pedal body 14. The gripping member 246 is positioned at a second grip position P32 relative to the first pedal body 14 in the second state where the second pedal body 16 is positioned at the second position P12 relative to the first pedal body 14. However, the first gripping portion 248 can be configured not to protrude from the first surface 21 at the second grip position P32 when viewed from the axial direction D1. In such an embodiment, the first gripping portion 248 is provided between the first surface 21 and the second surface 50 at the second grip position P32 when viewed from the axial direction D1.

As seen in FIG. 13, the gripping member 246 includes a second gripping portion 252. The second gripping portion 252 is configured to protrude from the second surface 50 when viewed from the axial direction D1 in the first state of the second pedal body 16. As seen in FIG. 14, the second gripping portion 252 is configured not to protrude from the second surface 50 when viewed from the axial direction D1 in the second state of the second pedal body 16. The second gripping portion 252 is provided between the first surface 21 and the second surface 50 when viewed from the axial direction D1 in the second state of the second pedal body 16. However, the second gripping portion 252 can be configured to protrude from the second surface 50 when viewed from the axial direction D1 in the second state of the second pedal body 16.

As seen in FIG. 13, the first gripping portion 248 protrudes from the first surface 21 by a first amount of protrusion M21 when viewed from the axial direction D1 in the first grip state where the gripping member 246 is positioned at the first grip position P31 relative to the first pedal body 14. The second gripping portion 252 protrudes from the second surface 50 by a second amount of protrusion M22 when viewed from the axial direction D1 in the first grip state of the gripping member 246. The second amount of protrusion M22 is smaller than the first amount of protrusion M21. In a state where the second surface 50 upwardly faces, the second gripping portion 252 is provided on a front side of the third cleat engagement member 22. In this state, the cleat 2 comes into engagement with the third cleat engagement member 22 before the cleat 2 comes into engagement with the fourth engagement member 24 in the step-in operation. Since the second amount of protrusion M22 is smaller than the first amount of protrusion M21, it is possible to reduce interference between the second gripping portion 252 and the sole 3a of the shoe 3 in the step-in operation, making the step-in operation smoother. However, the second amount of protrusion M22 can be equal to or larger than the first amount of protrusion M21.

As seen in FIG. 14, the first gripping portion 248 protrudes from the first surface 21 by a third amount of protrusion M23 when viewed from the axial direction D1 in the second grip state where the gripping member 246 is positioned at the second grip position P32 relative to the first pedal body 14. The third amount of protrusion M23 is smaller than the first amount of protrusion M21. The third amount of protrusion M23 is larger than the second amount of protrusion M22. However, the third amount of protrusion M23 can be equal to or smaller than the second amount of protrusion M22.

As seen in FIGS. 13 and 14, the bicycle pedal 210 comprises a biasing member 254. The biasing member 254 is configured to bias the second pedal body 16 toward the first position P11. The biasing member 254 is configured to bias the gripping member 246 such that, in response to a pivotal movement of the second pedal body 16 from the first position P11 to the second position P12, a tip end 248a of the first gripping portion 248 is moved toward the first surface 21 when viewed from the axial direction D1.

Figure 16:
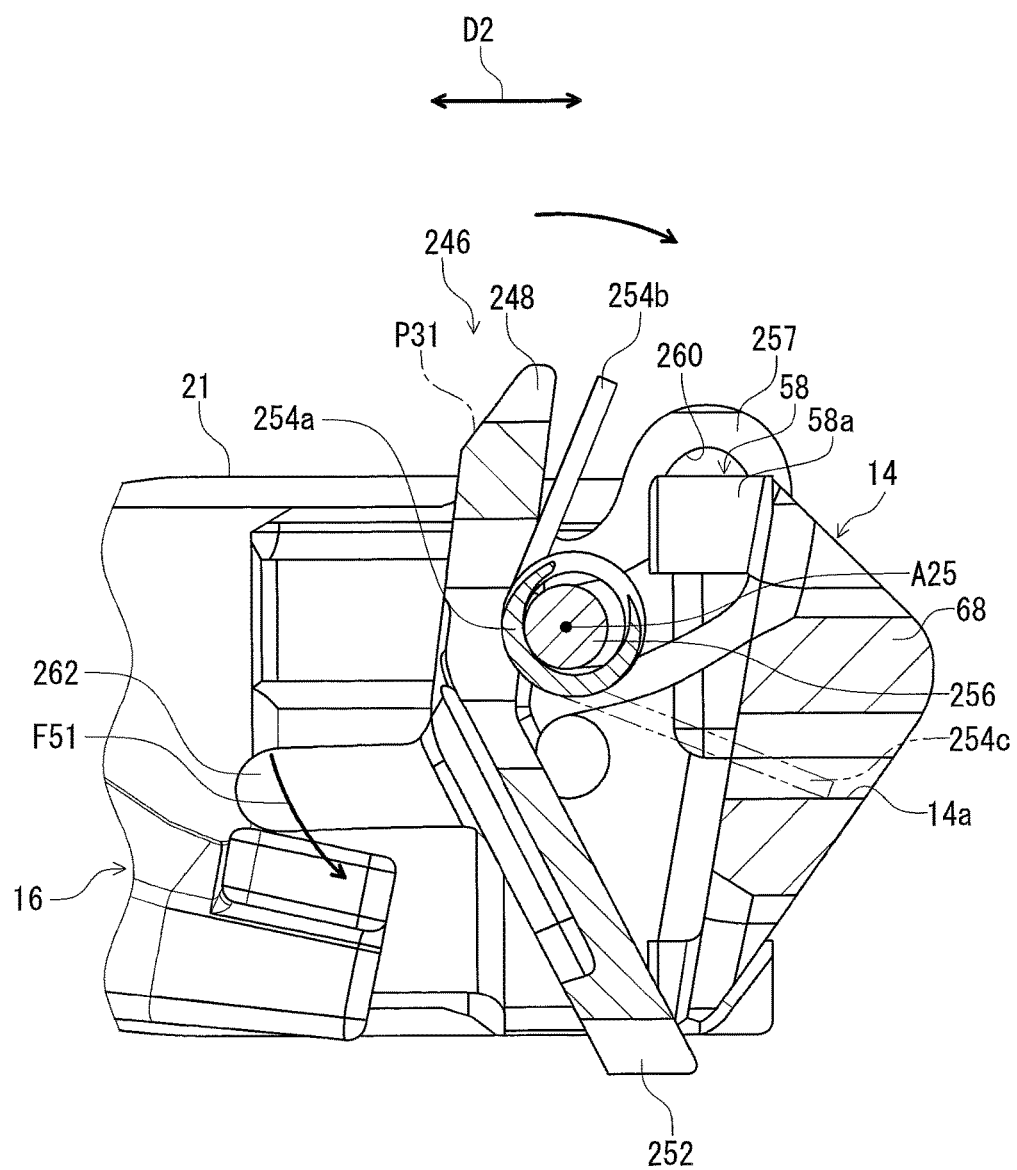
FIG. 16 is a partial cross-sectional view of the bicycle pedal illustrated in FIG. 12 (first position).

As seen in FIG. 16, the biasing member 254 includes a coiled body 254a. The coiled body 254a surrounds the pivot axis A25 when viewed from the axial direction D1. The biasing member 254 includes a first end 254b and a second end 254c. The first end 254b extends from the coiled body 254a and is engaged with the first gripping portion 248 to transmit a biasing force F51 to the first gripping portion 248. The second end 254c extends from the coiled body 254a and is engaged with an attachment hole 14a provided at the first pedal body 14.

Figure 17:
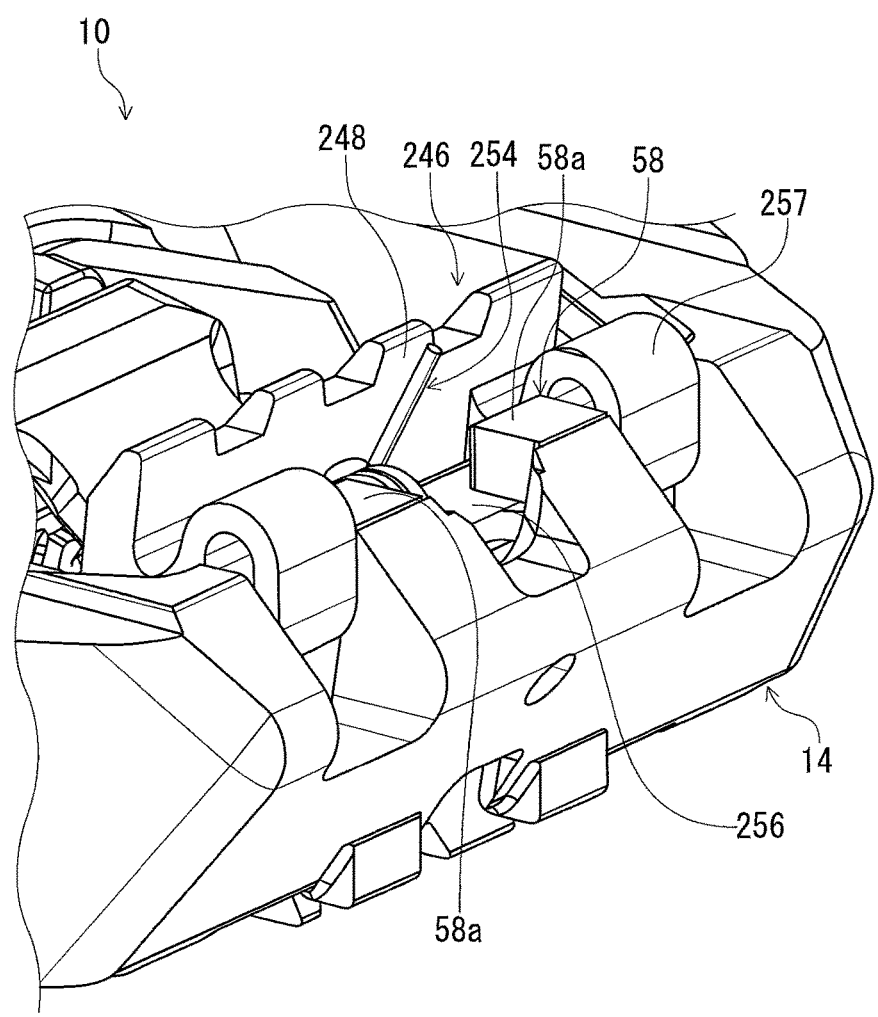
FIG. 17 is a partial perspective view of the bicycle pedal illustrated in FIG. 12.

As seen in FIG. 17, the first guide portion 58 is configured to guide the first gripping portion 248 when the first gripping portion 248 pivots relative to the second pedal body 16 about the pivot axis A25. In this embodiment, the second guide portion 60 is omitted from the first pedal body 14.

Figure 18:
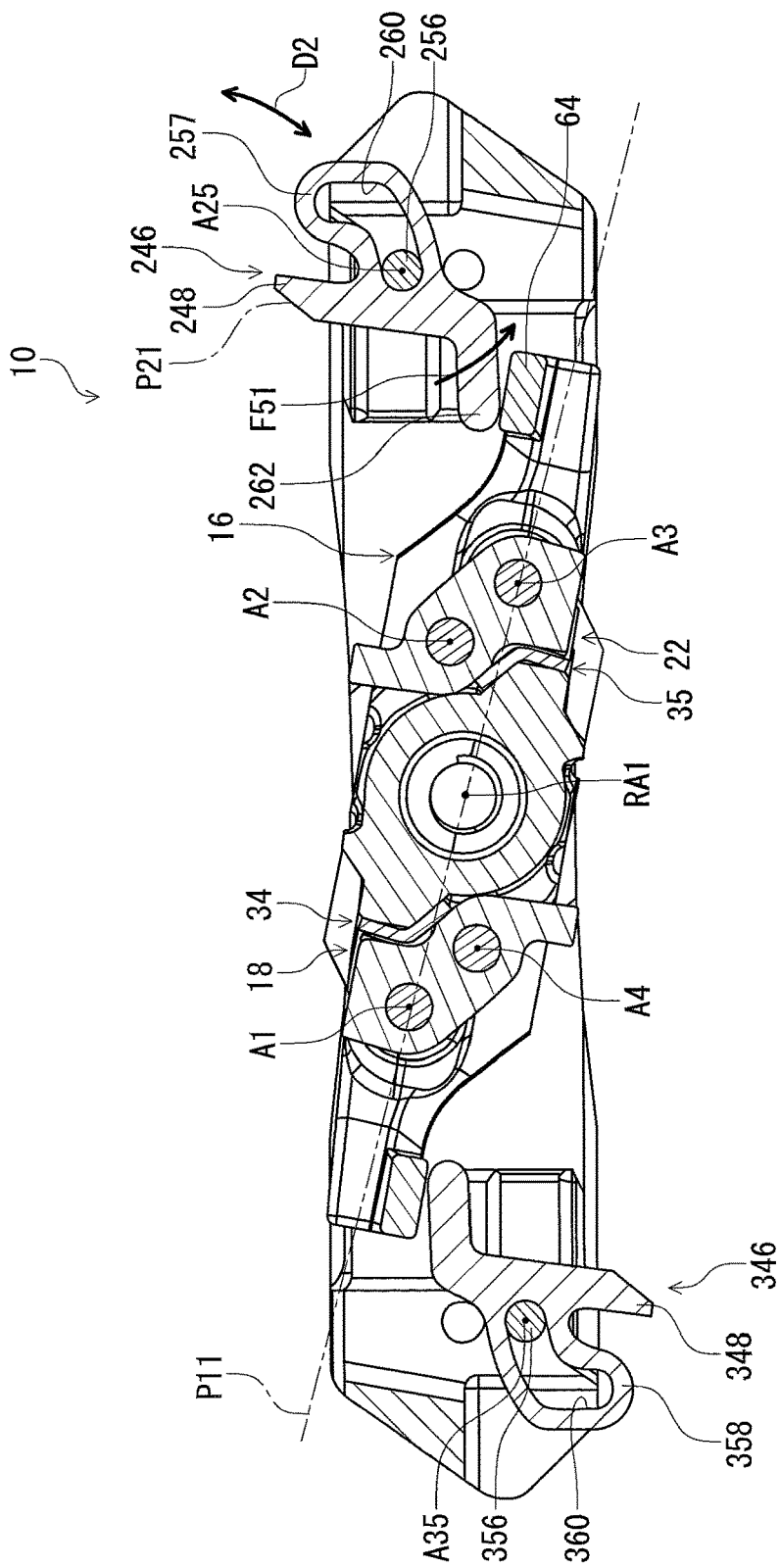
FIG. 18 is a cross-sectional view of the bicycle pedal illustrated in FIG. 12 (first position).

As seen in FIGS. 16 and 18, the bicycle pedal 210 further comprises a pivot shaft 256 configured to pivotally couple the gripping member 246 to the first pedal body 14 about a pivot axis A25 substantially parallel to the rotational axis RA1. The pivot shaft 256 is configured to be attached to the first pedal body 14. In this embodiment, the first gripping portion 248 and the second gripping portion 252 are integrally pivotable relative to the first pedal body 14 about the pivot axis A25 substantially parallel to the rotational axis RA1. The pivot shaft 256 is configured to support the biasing member 254 about the pivot axis A25 substantially parallel to the rotational axis RA1. As seen in FIG. 18, the pivot axis A25 is different from the rotational axis RA1. The pivot axis A25 is spaced apart from the rotational axis RA1.

Figure 19:
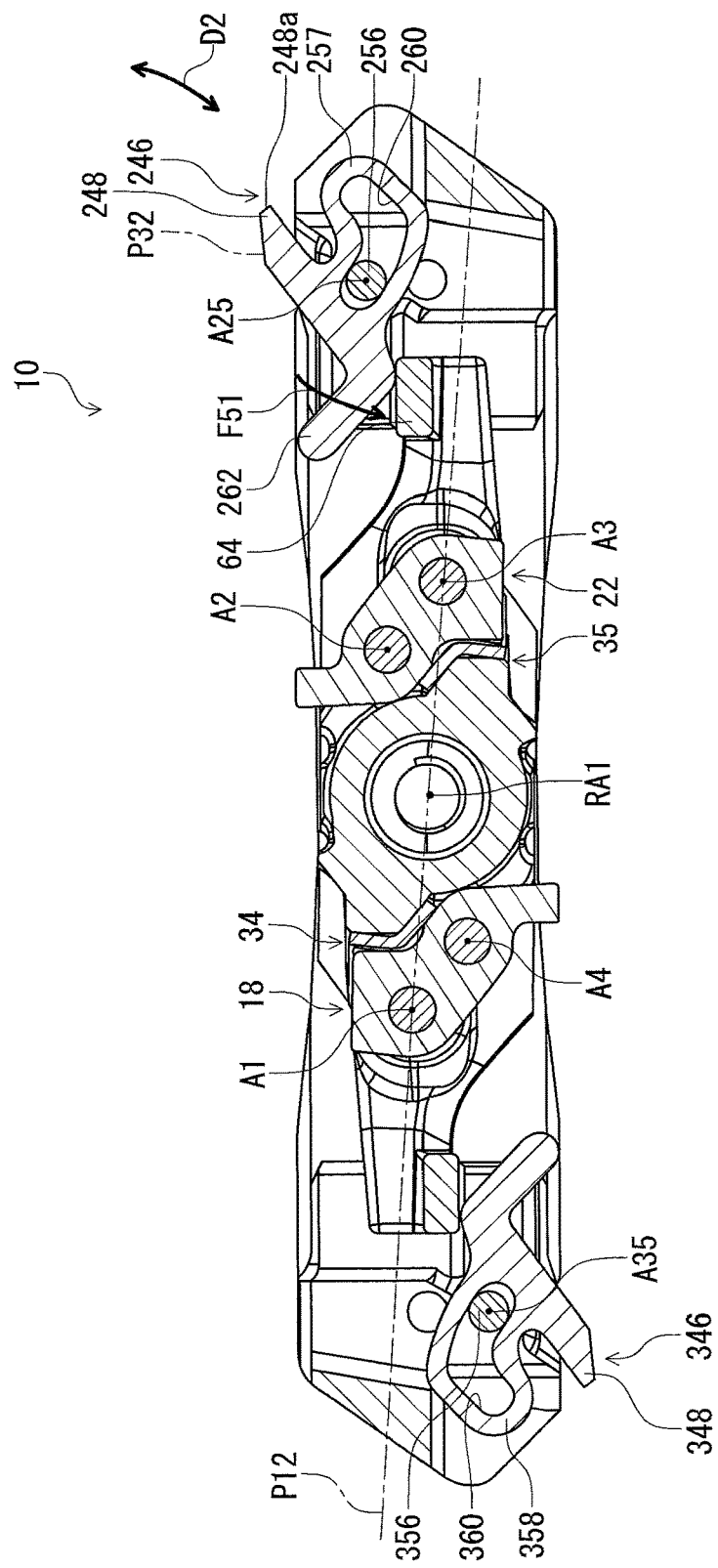
FIG. 19 is a cross-sectional view of the bicycle pedal illustrated in FIG. 12 (second position).

As seen in FIGS. 18 and 19, the biasing force transmitting member 246 is configured to contact the second pedal body 16 to transmit the biasing force F51 of the biasing member 254 to the second pedal body 16. The gripping member 246 includes a transmitting portion 262 configured to transmit a rotational force applied to the second pedal body 16 to the gripping member 246. The biasing member 254 (FIG. 16) is configured to bias the second pedal body 16 toward the first position P11 via the transmitting portion 262. The biasing member 254 (FIG. 16) is configured to apply the biasing force F51 to the second pedal body 16 via the transmitting portion 262.

In this embodiment, the biasing force transmitting member 246 (the gripping member 246) includes the first gripping portion 248 and the second gripping portion 252. However, at least one of the first gripping portion 248 and the second gripping portion 252 can be omitted from the biasing force transmitting member 246. The biasing force transmitting member 246 can only be configured to transmit the biasing force F51 from the biasing member 254 to the second pedal body 16.

As seen in FIG. 13, the first gripping portion 248 is closer to the second part 68 than to the first part 66. The second gripping portion 252 is closer to the second part 68 than to the first part 66. The first gripping portion 248 and the second gripping portion 252 are integrally pivotable relative to the first pedal body 14 about the pivot axis A25 substantially parallel to the rotational axis RA1. The second cleat engagement member 20 is closer to the first gripping portion 248 than the first cleat engagement member 18. The second cleat engagement member 20 is provided between the first cleat engagement member 18 and the gripping member 246.

The tip end 248a of the first gripping portion 248 is provided above the second cleat engagement member 20 when the first surface 21 upwardly faces in the first state of the second pedal body 16. An uppermost end 18a of the first cleat engagement member 18 is provided above an uppermost end 20a of the second cleat engagement member 20 when the first surface 21 upwardly faces in the first state of the second pedal body 16.

As seen in FIG. 14, the uppermost end 20a of the second cleat engagement member 20 is provided above the first gripping portion 248 when the first surface 21 upwardly faces in the second state where the second pedal body 16 is positioned at the second position P12 relative to the first pedal body 14.

Figure 20:
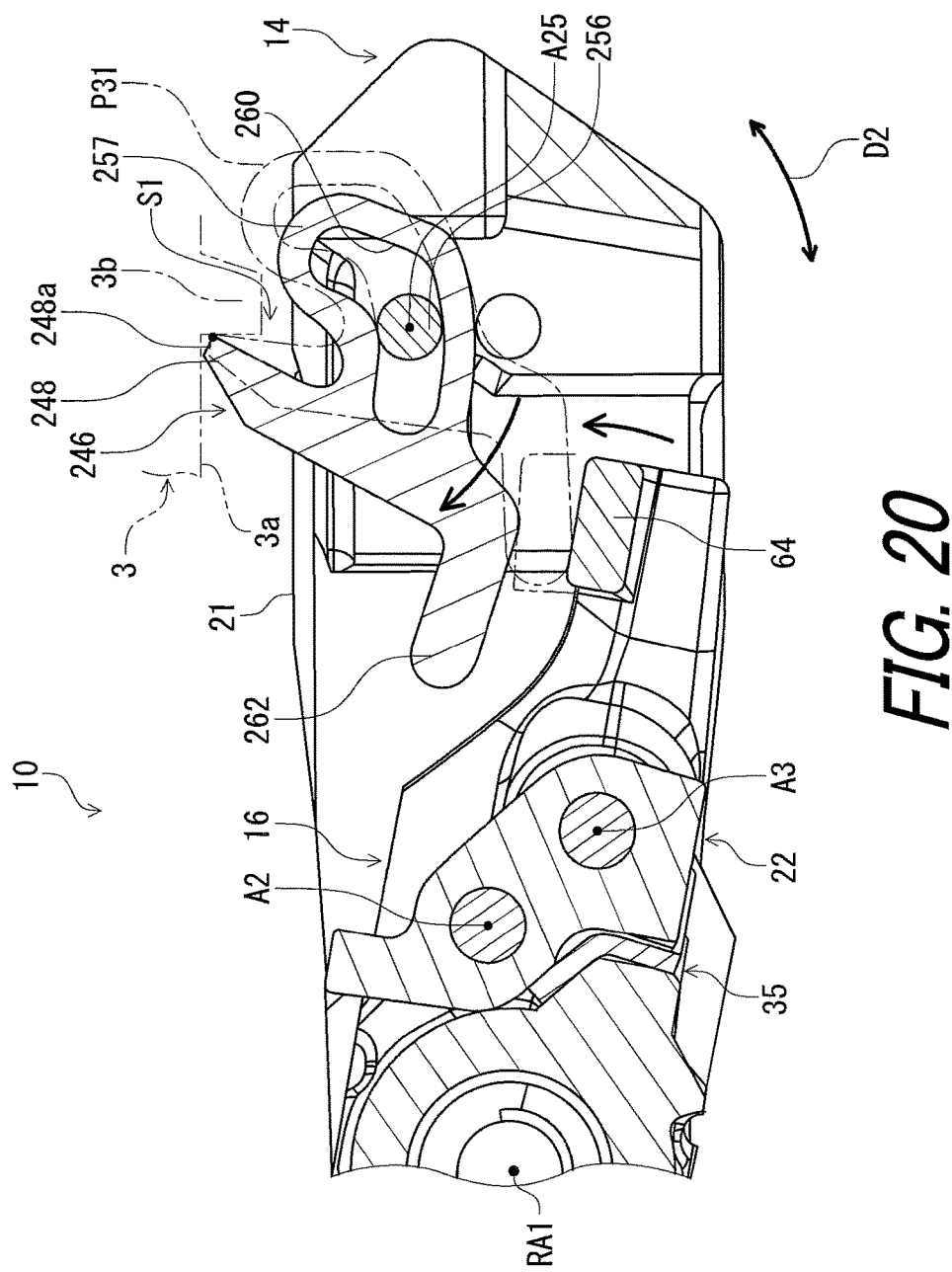
FIG. 20 is a partial cross-sectional view of the bicycle pedal illustrated in FIG. 12.

As seen in FIG. 20, the pivot shaft 256 is configured to guide the gripping member 246 to move relative to the first pedal body 14 in a guiding direction D2 perpendicular to the pivot axis A25. The gripping member 246 includes a guide part 257 slidable with the pivot shaft 256 such that the first gripping portion 248 is movable relative to the first pedal body 14 in the guiding direction D2. In this embodiment, the guiding direction D2 is defined along a direction which directs from the first surface 21 to the rotational axis RA1. Specifically, the guiding direction D2 is defined by a movement path of the tip end 248 of the first gripping portion 248 from the first grip position P31 to the second grip position P32.

The guide part 257 extends in the guiding direction D2 when viewed from the axial direction D1 in a first grip state where the gripping member 246 is positioned at the first grip position P31 relative to the first pedal body 14. In this embodiment, the guide part 257 includes an elongated hole 260 extending in the guiding direction D2 when viewed from the axial direction D1 in the first grip state of the gripping member 246. The pivot shaft 256 extends through the elongated hole 260. Since the guide part 257 extends in the guiding direction D2, the gripping member 246 is pivotable relative to the first pedal body 14 about the tip end 248a of the first gripping portion 248 even when a protruding part 3b of the sole 3a of the shoe 3 is inserted in a space S1 adjacent to the first gripping portion 248. This allows the second pedal body 16 to pivot relative to the first pedal body 14 toward the second position P12 about the rotational axis RA1.

As seen in FIGS. 12 to 20, the bicycle pedal 210 comprises a gripping member 346, a biasing member 354, and a pivot shaft 356. The gripping member 346 includes a first gripping portion 348, a second gripping portion 352, a guide part 358, and an elongated hole 360. The gripping member 346, the biasing member 354, and the pivot shaft 356 have substantially the same structures as those of the gripping member 246, the biasing member 254, and the pivot shaft 256, respectively. The first gripping portion 348, the second gripping portion 352, the guide part 358, and the elongated hole 360 have substantially the same structures as those of the first gripping portion 248, the second gripping portion 252, the guide part 358, and the elongated hole 360, respectively. A pivot axis A35 has substantially the same construction as that of the pivot axis A25. Thus, they will not be described and/or illustrated in detail here for the sake of brevity.

The features of the bicycle pedal 210 are summarized as follows.

(1) The gripping member 246 is configured to be movably coupled to the first pedal body 14. The gripping member 246 includes the first gripping portion 248 configured to protrude from the first surface 21 when viewed from the axial direction D1 in the first state where the second pedal body 16 is positioned at the first position P11 relative to the first pedal body 14. The biasing member 254 is configured to bias the gripping member 246 such that, in response to the pivotal movement of the second pedal body 16 from the first position P11 to the second position P12, the tip end of the first gripping portion 248 is moved toward the first surface 21 when viewed from the axial direction D1. Accordingly, it is possible to move the first gripping portion 248 toward the first surface 21 in response to the pivotal movement of the second pedal body 16 from the first position P11 to the second position P12.

(2) The pivot shaft 256 is configured to pivotally couple the gripping member 246 to the first pedal body 14 about the pivot axis A25 substantially parallel to the rotational axis RA1. Accordingly, it is possible to support the gripping member 246 with a simple structure.

(3) The pivot shaft 256 is configured to be attached to the first pedal body 14. Accordingly, it is possible to support the gripping member 246 relative to the first pedal body 14 with a simple structure.

(4) The pivot shaft 256 is configured to guide the gripping member 246 to move relative to the first pedal body 14 in a guiding direction D2 perpendicular to the pivot axis A25. Accordingly, it is possible to pivot and/or move the gripping member 246 relative to the first pedal body 14 when an external force is applied from the sole 3a of the shoe 3 to the gripping member 246. This can reduce the gripping member 246 from inhibiting relative movement between the shoe 3 and the first pedal body 14.

(5) The gripping member 246 includes the guide part 257 slidable with the pivot shaft 256 such that the first gripping portion 248 is movable relative to the first pedal body 14 in the guiding direction D2. Accordingly, it is possible to easily guide the gripping member 246 in the guiding direction D2.

(6) The guide part 257 includes the elongated hole 260 extending in the guiding direction D2 when viewed from the axial direction D1 in the first grip state of the gripping member 246. The pivot shaft 256 extends through the elongated hole 260. Accordingly, it is possible to guide the gripping member 246 in the guiding direction D2 with a simple structure.

(7) The gripping member 246 includes the transmitting portion 62 configured to transmit the rotational force applied to the second pedal body 16 to the gripping member 246. Accordingly, it is possible to move the gripping member 246 in response to the movement of the second pedal body 16.

(8) The biasing member 254 is configured to bias the second pedal body 16 toward the first position P11 via the transmitting portion 62. Accordingly, it is possible to utilize the biasing member 254 to move the second pedal body 16 toward the first position P11. This can omit another biasing member move the second pedal body 16 relative to the first pedal body 14 toward the first position P11.

(10) The gripping member 246 includes the second gripping portion 252 configured to protrude from the second surface 50 when viewed from the axial direction D1 in the first state of the second pedal body 16. Accordingly, it is possible to use the second gripping portion 252 to grip the sole 3a of the shoe 3 when the second surface 50 upwardly faces.

(11) The first gripping portion 248 and the second gripping portion 252 are integrally pivotable relative to the first pedal body 14 about the pivot axis A25 substantially parallel to the rotational axis RA1. Accordingly, it is possible to move the first gripping portion 248 and the second gripping portion 252 together with a simple structure.

(12) The tip end 248a of the first gripping portion 248 is provided above the second cleat engagement member 20 when the first surface 21 upwardly faces in the first state of the second pedal body 16. Accordingly, it is possible to increase the gripping function of the first gripping portion 248 in the first state of the second pedal body 16.

(13) The uppermost end 20a of the second cleat engagement member 20 is provided above the first gripping portion 248 when the first surface 21 upwardly faces in a second state where the second pedal body 16 is positioned at the second position P12 relative to the first pedal body 14. Accordingly, it is possible to restrict the first gripping portion 248 from inhibiting relative movement between the shoe 3 and the first pedal body 14 in the second state of the second pedal body 16.

(14) The biasing member 254 is configured to bias the second pedal body 16 toward the first position P11. The pivot shaft 256 is configured to support the biasing member 254 about the pivot axis A25 substantially parallel to the rotational axis RA1. The pivot shaft 256 is different from the rotational axis RA1. Accordingly, it is possible to bias the second pedal body 16 toward the first position P11 with a simple structure. Thus, it is possible to omit another biasing member provided on the rotational axis RA1 to bias the second pedal body 16 toward the first position P11.

(15) The biasing force transmitting member 246 is rotatably disposed about the pivot axis A25. The biasing force transmitting member 246 is configured to contact the second pedal body 16 to transmit the biasing force F51 of the biasing member 254 to the second pedal body 16. Accordingly, it is possible to effectively transmit the biasing force F51 to the second pedal body 16 via the biasing force transmitting member 246.

It will be apparent to those skilled in the bicycle field from the present disclosure that the structures of the above embodiments can be at least partly combined with each other.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" and "element" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle pedal comprising:
a pedal axle having a rotational axis;
a first pedal body rotatably coupled to the pedal axle about the rotational axis, the first pedal body including a first surface;
a second pedal body rotatably coupled to the pedal axle about the rotational axis, the second pedal body being pivotable relative to the first pedal body about the rotational axis between a first position and a second position;
a first cleat engagement member coupled to the second pedal body;
a second cleat engagement member coupled to the second pedal body, the first cleat engagement member and the second cleat engagement member being configured to be engaged with a cleat attached to a shoe to couple the cleat to the second pedal body;
a gripping member movably coupled to the first pedal body, the gripping member including a first gripping portion configured to protrude from the first surface when viewed from an axial direction parallel to the rotational axis in a first state where the second pedal body is positioned at the first position relative to the first pedal body; and
a biasing member configured to bias the gripping member such that, in response to a pivotal movement of the second pedal body from the first position to the second position, a tip end of the first gripping portion is moved toward or away from the rotational axis and toward the first surface when viewed from the axial direction.

2. The bicycle pedal according to claim 1, wherein the gripping member includes a transmitting portion configured to transmit a rotational force applied to the second pedal body to the gripping member.

3. The bicycle pedal according to claim 2, wherein the biasing member is configured to bias the second pedal body toward the first position via the transmitting portion.

4. The bicycle pedal according to claim 1, wherein the first pedal body includes a second surface opposite to the first surface, and
the gripping member includes a second gripping portion configured to protrude from the second surface when viewed from the axial direction in the first state of the second pedal body.

5. The bicycle pedal according to claim 4, wherein the first pedal body includes a first part and a second part opposite to the first part relative to the rotational axis,
the first gripping portion is closer to the second part than to the first part, and
the second gripping portion is closer to the second part than to the first part.

6. The bicycle pedal according to claim 4, wherein the gripping member is positioned at a first grip position relative to the first pedal body in the first state of the second pedal body,
the first gripping portion protrudes from the first surface by a first amount of protrusion when viewed from the axial direction in a first grip state where the gripping member is positioned at the first grip position relative to the first pedal body,
the second gripping portion protrudes from the second surface by a second amount of protrusion when viewed from the axial direction in the first grip state of the gripping member, and
the second amount of protrusion is substantially equal to the first amount of protrusion.

7. The bicycle pedal according to claim 4, wherein the gripping member includes a support portion pivotable relative to the first pedal body about a pivot axis substantially parallel to the rotational axis, and
the first gripping portion is pivotally coupled to the support portion about a first additional pivot axis different from the pivot axis.

8. The bicycle pedal according to claim 7, wherein the second gripping portion is pivotally coupled to the support portion about a second additional pivot axis different from the pivot axis and the first additional pivot axis, and
the pivot axis is provided between the first additional pivot axis and the second additional pivot axis when viewed from the axial direction.

9. The bicycle pedal according to claim 8, wherein the first pedal body includes a first guide portion and a second guide portion,
the first guide portion is configured to guide the first gripping portion when the first gripping portion pivots relative to the support portion about the first additional pivot axis, and
the second guide portion is configured to guide the second gripping portion when the second gripping portion pivots relative to the support portion about the second additional pivot axis.

10. The bicycle pedal according to claim 7, wherein the biasing member includes a coiled body, and
the coiled body surrounds the first additional pivot axis when viewed from the axial direction.

11. The bicycle pedal according to claim 10, wherein the biasing member includes a first end and a second end,
the first end extends from the coiled body and is engaged with the first gripping portion to transmit the biasing force to the first gripping portion, and
the second end extends from the coiled body and is engaged with the second gripping portion to transmit the biasing force to the second gripping portion.

12. The bicycle pedal according to claim 4, wherein the gripping member is positioned at a first grip position relative to the first pedal body in the first state of the second pedal body,
the first gripping portion protrudes from the first surface by a first amount of protrusion when viewed from the axial direction in a first grip state where the gripping member is positioned at the first grip position relative to the first pedal body,
the second gripping portion protrudes from the second surface by a second amount of protrusion when viewed from the axial direction in the first grip state of the gripping member, and
the second amount of protrusion is smaller than the first amount of protrusion.

13. The bicycle pedal according to claim 4, wherein
the first gripping portion and the second gripping portion are integrally pivotable relative to the first pedal body about a pivot axis substantially parallel to the rotational axis.

14. The bicycle pedal according to claim 1, wherein
the second cleat engagement member is closer to the first gripping portion than the first cleat engagement member, and
the tip end of the first gripping portion is provided above the second cleat engagement member when the first surface upwardly faces in the first state of the second pedal body.

15. The bicycle pedal according to claim 14, wherein
an uppermost end of the second cleat engagement member is provided above the first gripping portion when the first surface upwardly faces in a second state where the second pedal body is positioned at the second position relative to the first pedal body.

16. The bicycle pedal according to claim 1, wherein
an uppermost end of the first cleat engagement member is provided above an uppermost end of the second cleat engagement member when the first surface upwardly faces in the first state of the second pedal body.

17. The bicycle pedal according to claim 1, wherein
the tip end of the first gripping portion is configured to move simultaneously toward the first pedal body and toward the second pedal body.

18. The bicycle pedal according to claim 1, wherein
the first gripping portion is pivotally coupled to the first pedal body about a pivot axis substantially parallel to the rotational axis.

19. A bicycle pedal comprising:
a pedal axle having a rotational axis;
a first pedal body rotatably coupled to the pedal axle about the rotational axis, the first pedal body including a first surface;
a second pedal body rotatably coupled to the pedal axle about the rotational axis, the second pedal body being pivotable relative to the first pedal body about the rotational axis between a first position and a second position;
a first cleat engagement member coupled to the second pedal body;
a second cleat engagement member coupled to the second pedal body, the first cleat engagement member and the second cleat engagement member configured to be engaged with a cleat attached to a shoe to couple the cleat to the second pedal body;
a gripping member movably coupled to the first pedal body, the gripping member including a first gripping portion configured to protrude from the first surface when viewed from an axial direction parallel to the rotational axis in a first state where the second pedal body is positioned at the first position relative to the first pedal body;
a biasing member configured to bias the gripping member such that, in response to a pivotal movement of the second pedal body from the first position to the second position, a tip end of the first gripping portion is moved toward the first surface when viewed from the axial direction; and
a pivot shaft that pivotally couples the gripping member to the first pedal body about a pivot axis substantially parallel to the rotational axis.

20. The bicycle pedal according to claim 19, wherein
the pivot shaft is attached to the first pedal body.

21. The bicycle pedal according to claim 19, wherein
the pivot shaft is configured to guide the gripping member to move relative to the first pedal body in a guiding direction perpendicular to the pivot axis.

22. The bicycle pedal according to claim 21, wherein
the gripping member includes a guide part slidable with the pivot shaft such that the first gripping portion is movable relative to the first pedal body in the guiding direction.

23. The bicycle pedal according to claim 22, wherein
the gripping member is positioned at a first grip position relative to the first pedal body in the first state where the second pedal body is positioned at the first position relative to the first pedal body, and
the guide part extends in the guiding direction when viewed from the axial direction in a first grip state where the gripping member is positioned at the first grip position relative to the first pedal body.

24. The bicycle pedal according to claim 23, wherein
the guide part includes an elongated hole extending in the guiding direction when viewed from the axial direction in the first grip state of the gripping member, and
the pivot shaft extends through the elongated hole.

25. A bicycle pedal comprising:
a pedal axle having a rotational axis;
a first pedal body rotatably coupled to the pedal axle about the rotational axis;
a second pedal body rotatably coupled to the pedal axle about the rotational axis, the second pedal body being pivotable relative to the first pedal body about the rotational axis between a first position and a second position;
a front cleat engagement member coupled to the second pedal body;
a rear cleat engagement member coupled to the second pedal body, the front cleat engagement member and the rear cleat engagement member being configured to be engaged with a cleat attached to a shoe to couple the cleat to the second pedal body;
a gripping member movably coupled to the first pedal body, the gripping member being disposed towards a front of the bicycle pedal with respect to the front cleat engagement member or towards a rear of the bicycle pedal with respect to the rear cleat engagement member;
a biasing member configured to bias the second pedal body toward the first position about the rotational axis; and
a pivot shaft that supports the biasing member about a pivot axis substantially parallel to the rotational axis, the pivot axis being different from the rotational axis.

26. The bicycle pedal according to claim 25, further comprising:
a biasing force transmitting member rotatably disposed about the pivot axis, the biasing force transmitting member being configured to contact the second pedal body to transmit the biasing force of the biasing member to the second pedal body.

27. The bicycle pedal according to claim 25, wherein the biasing member is configured to bias the second pedal body and the gripping member.

28. A bicycle pedal comprising:
a pedal axle having a rotational axis;
a first pedal body rotatably coupled to the pedal axle about the rotational axis;

a second pedal body rotatably coupled to the pedal axle about the rotational axis, the second pedal body being pivotable relative to the first pedal body about the rotational axis between a first position and a second position;
a first cleat engagement member coupled to the second pedal body;
a second cleat engagement member coupled to the second pedal body, the first cleat engagement member and the second cleat engagement member being configured to be engaged with a cleat attached to a shoe to couple the cleat to the second pedal body;
a biasing member configured to bias the second pedal body toward the first position about the rotational axis;
a pivot shaft that supports the biasing member about a pivot axis substantially parallel to the rotational axis, the pivot axis being different from the rotational axis; and
a gripping member movably coupled to the first pedal body, the gripping member including a first gripping portion configured to protrude from a first surface of the first pedal body when viewed from an axial direction parallel to the rotational axis in a first state where the second pedal body is positioned at the first position relative to the first pedal body, wherein
the biasing member is configured to bias the gripping member such that, in response to a pivotal movement of the second pedal body from the first position to the second position, a tip end of the first gripping portion is moved toward the first surface when viewed from the axial direction.

29. The bicycle pedal according to claim 28, wherein the tip end of the first gripping portion is configured to move simultaneously toward the first pedal body and toward the second pedal body.

30. The bicycle pedal according to claim 28, wherein the first gripping portion is pivotally coupled to the first pedal body about the pivot axis.

\* \* \* \* \*